US005775803A

United States Patent [19]

Montgomery et al.

[11] Patent Number: 5,775,803
[45] Date of Patent: Jul. 7, 1998

[54] AUTOMATIC CEMENTING SYSTEM WITH IMPROVED DENSITY CONTROL

[75] Inventors: Clifford Stanley Montgomery, Houston; Michael P. Dearing, Sr., Cypress; Bruce A. Vicknair, Baytown; Randall R. Price, Houston; Robert A. Baten, Friendswood; Greg L. Cedillo; John Howard Craig, both of Houston, all of Tex.

[73] Assignee: Stewart & Stevenson Services, Inc., Houston, Tex.

[21] Appl. No.: 791,936

[22] Filed: Jan. 31, 1997

(Under 37 CFR 1.47)

Related U.S. Application Data

[63] Continuation-in-part of Ser. No. 394,476, Feb. 27, 1995, Pat. No. 5,624,182, which is a continuation-in-part of Ser. No. 178,659, Jan. 7, 1994, Pat. No. 5,503,473, which is a continuation-in-part of Ser. No. 969,944, Oct. 30, 1992, abandoned, which is a division of Ser. No. 389,923, Aug. 2, 1989, Pat. No. 5,281,023, said Ser. No. 394,476, is a continuation-in-part of Ser. No. 308,477, Sep. 19, 1994, Pat. No. 5,441,340, which is a continuation of Ser. No. 969,944.

[51] Int. Cl.$^6$ ....................................................... B01F 15/04
[52] U.S. Cl. ................................ 366/2; 366/17; 366/20; 366/152.2
[58] Field of Search ........................ 366/17, 20, 62, 366/2, 152.2; 137/13; 73/151; 166/308, 280

[56] References Cited

U.S. PATENT DOCUMENTS

| | | |
|---|---|---|
| 3,326,536 | 6/1967 | Zingg et al. . |
| 3,379,421 | 4/1968 | Putman . |
| 4,003,431 | 1/1977 | Noyotny et al. . |
| 4,091,462 | 5/1978 | Igarasihi et al. . |
| 4,265,266 | 5/1981 | Kierbow et al. . |
| 4,298,288 | 11/1981 | Weisbrod ............... 366/20 |
| 4,538,222 | 8/1985 | Crain . |
| 4,726,219 | 2/1988 | Person et al. ............ 73/53 |
| 4,779,186 | 10/1988 | Handke et al. . |
| 4,845,981 | 7/1989 | Pearson . |
| 4,930,576 | 6/1990 | Berryman et al. . |

*Primary Examiner*—Frankie L. Stinson
*Attorney, Agent, or Firm*—Conley, Rose & Tayon, P.C.

[57] ABSTRACT

An automatic cementing system and method are disclosed for precisely controlling the density of a slurry during a continuously mixed cement application. The system includes an input water line and a dry cement hopper for supplying water and cement, respectively, to a mixing chamber. The mixing chamber includes two chambers, Chamber A and Chamber B, for thoroughly mixing the water and cement together to form a cement slurry. Chamber B includes a level sensor for measuring the change in slurry level. The input line includes a pump for supplying the water to the mixing chamber, and a flow meter for measuring the rate at which the water is supplied. Similarly, the hopper includes a slide-gate valve for regulating the rate at which the dry cement is supplied to the mixing chamber. A discharge line with a discharge pump and a discharge flow meter receives and discharges cement slurry. A recirculation line is included for density control during initialization. A system controller receives operational parameters from the operator, including desired slurry density, mix water density, and dry cement density. As the slurry discharge rate increases to the desired value, the mix water flow rate increases to maintain the calculated volume percentage of mix water in the discharge slurry constant. The tub level drops, causing the slide-gate valve to open and add cement, raising the tub level to the setpoint level and maintaining an accurate discharge slurry density.

20 Claims, 14 Drawing Sheets

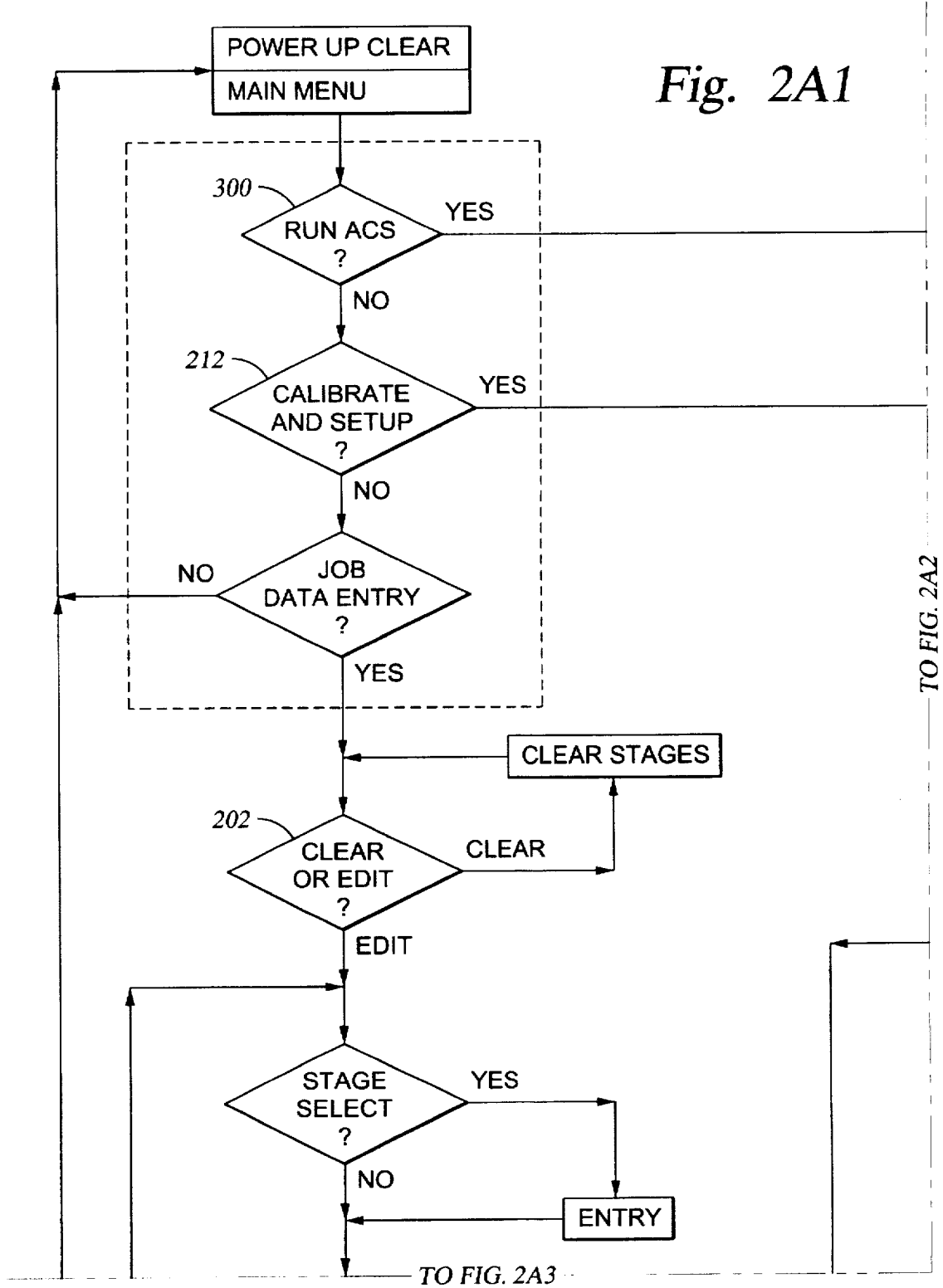
Fig. 2A1

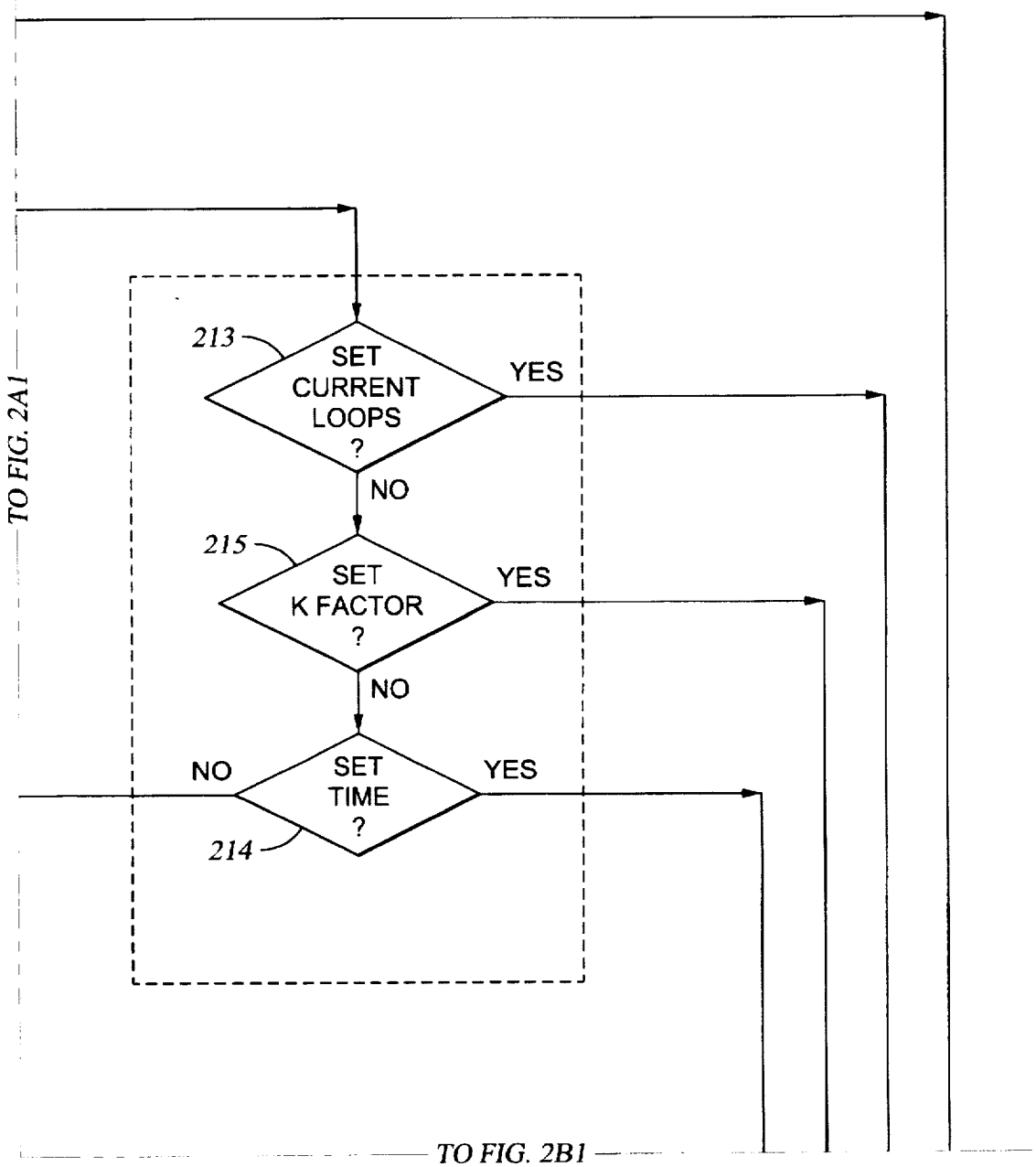
Fig. 2A2

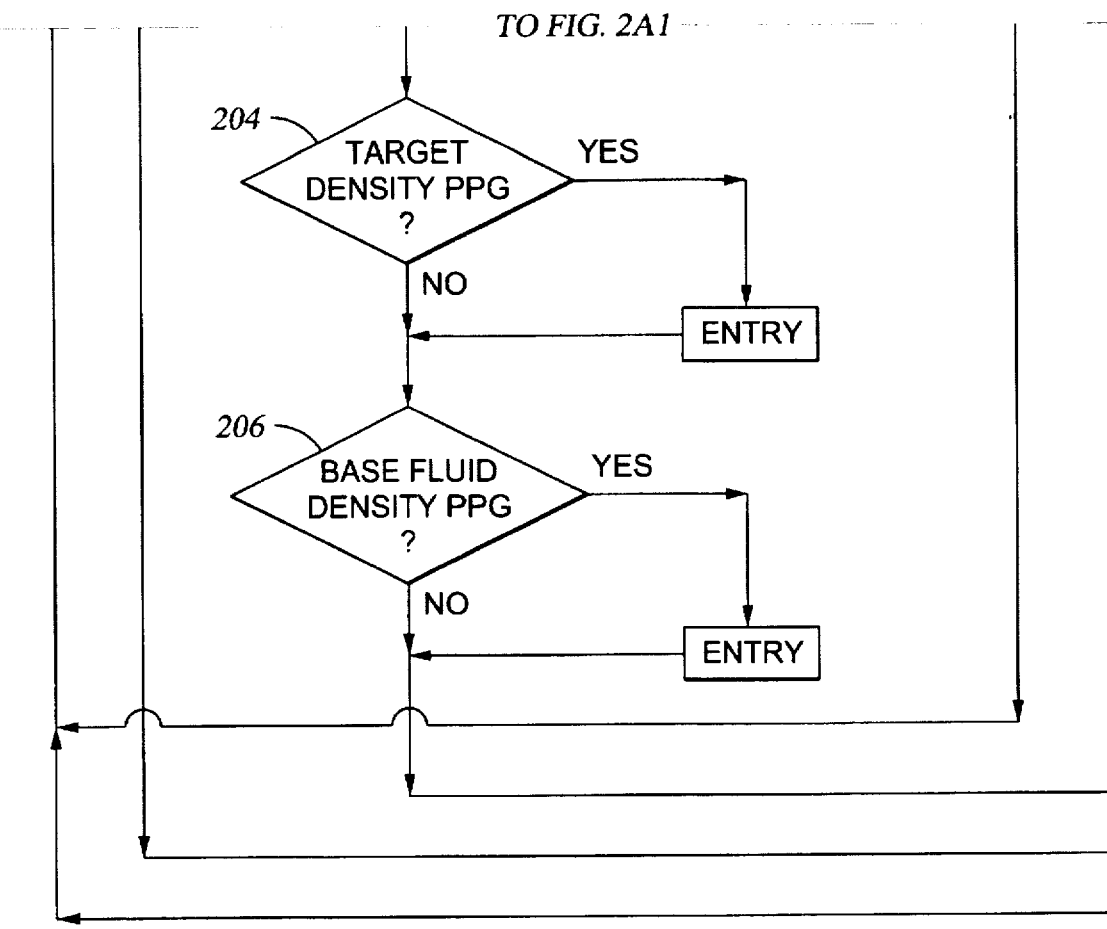
Fig. 2A3

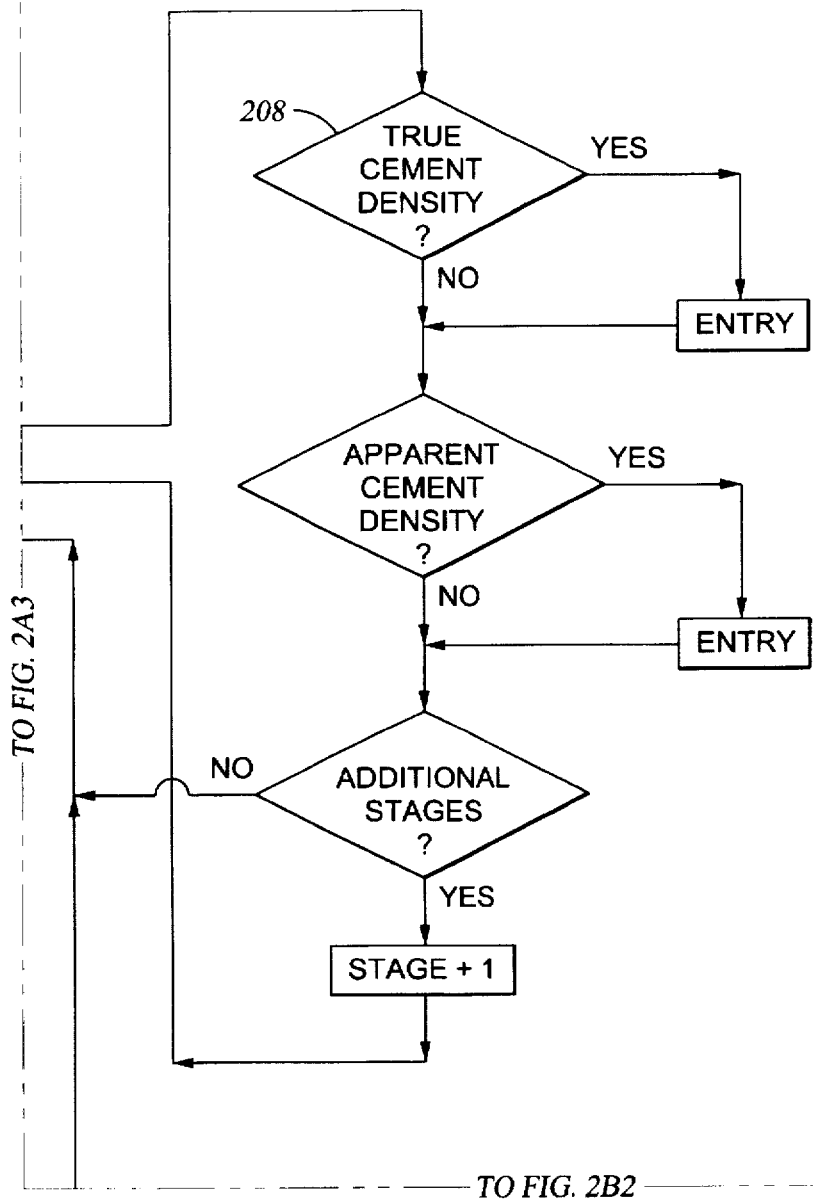

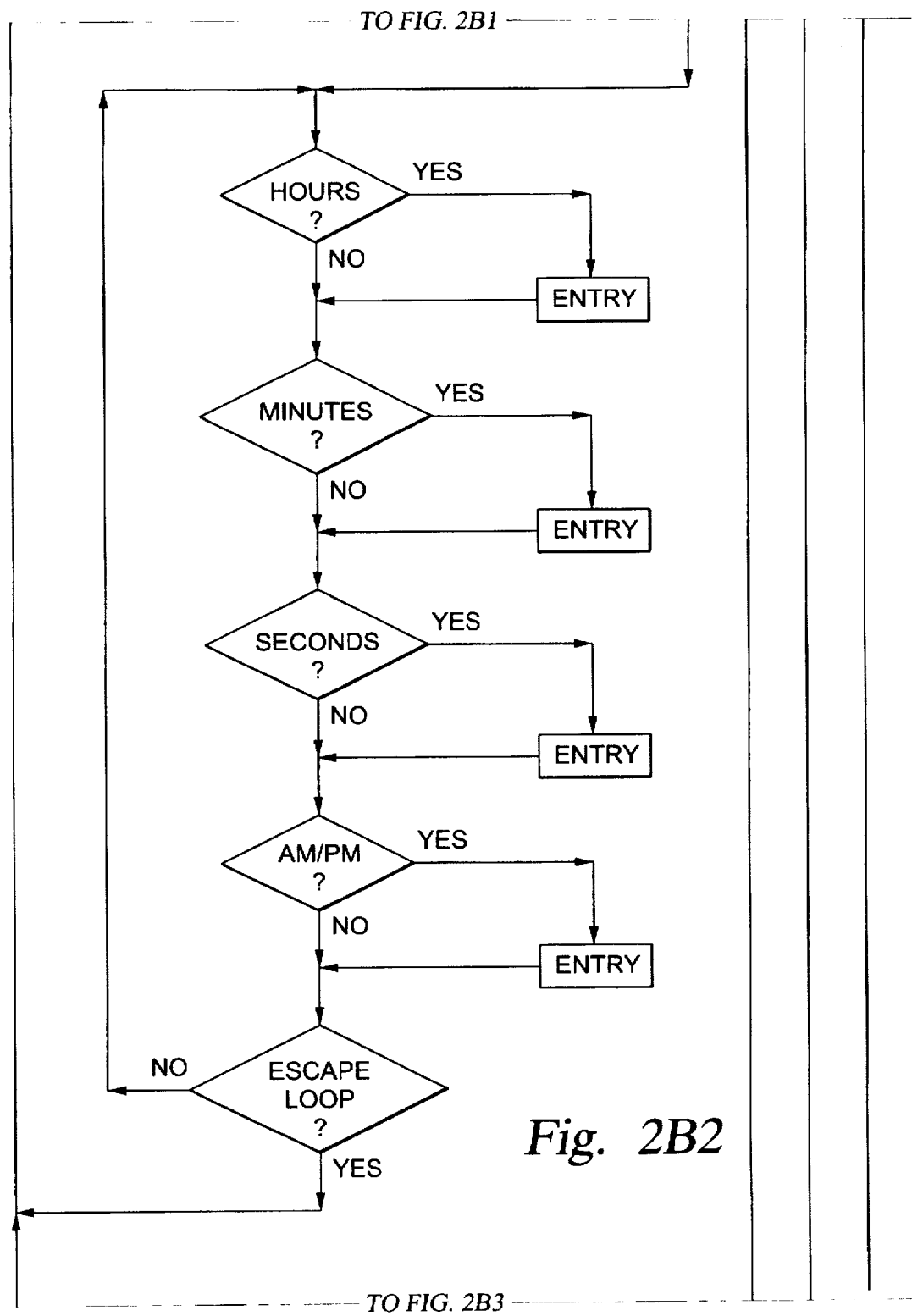
Fig. 2B2

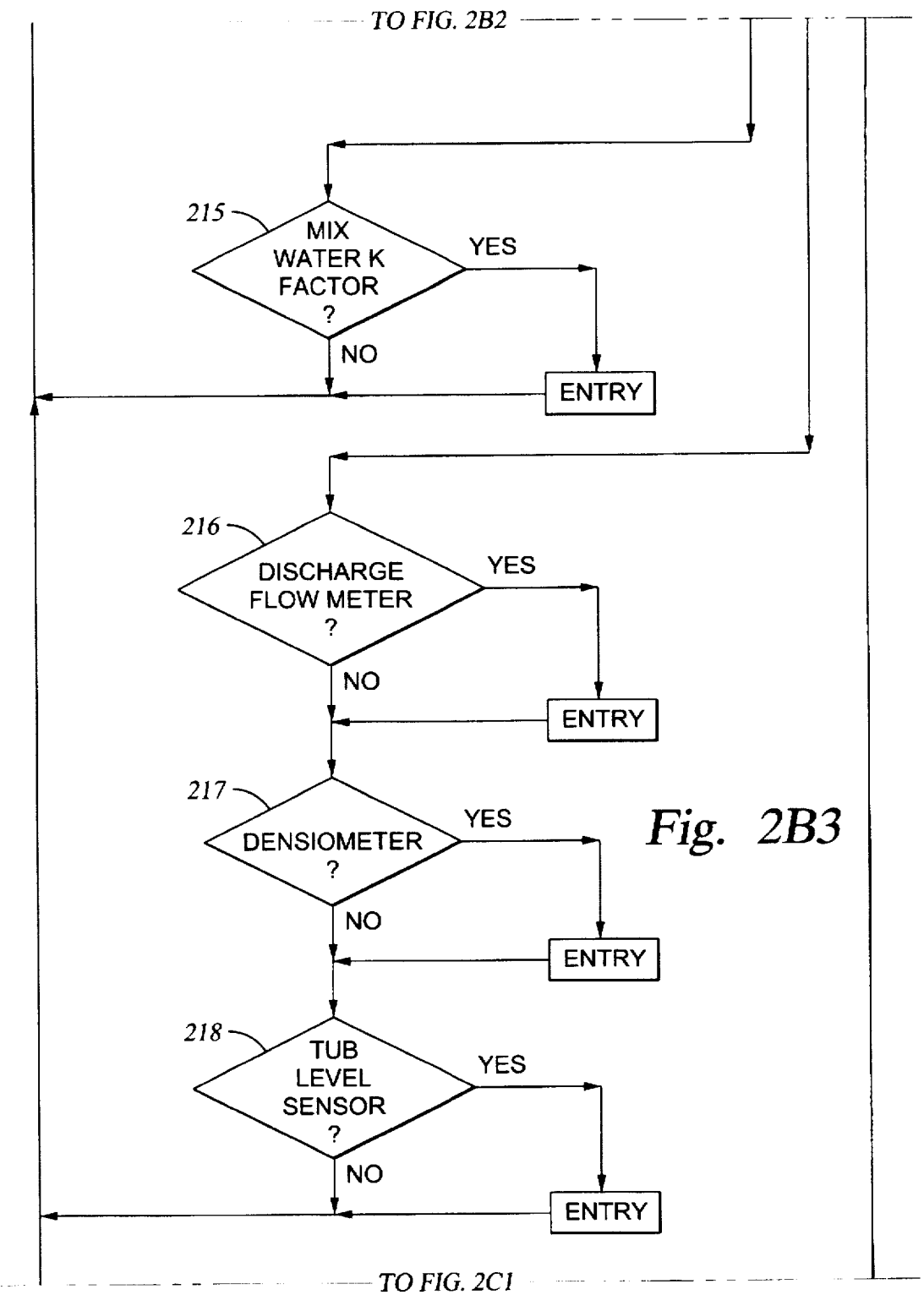
Fig. 2B3

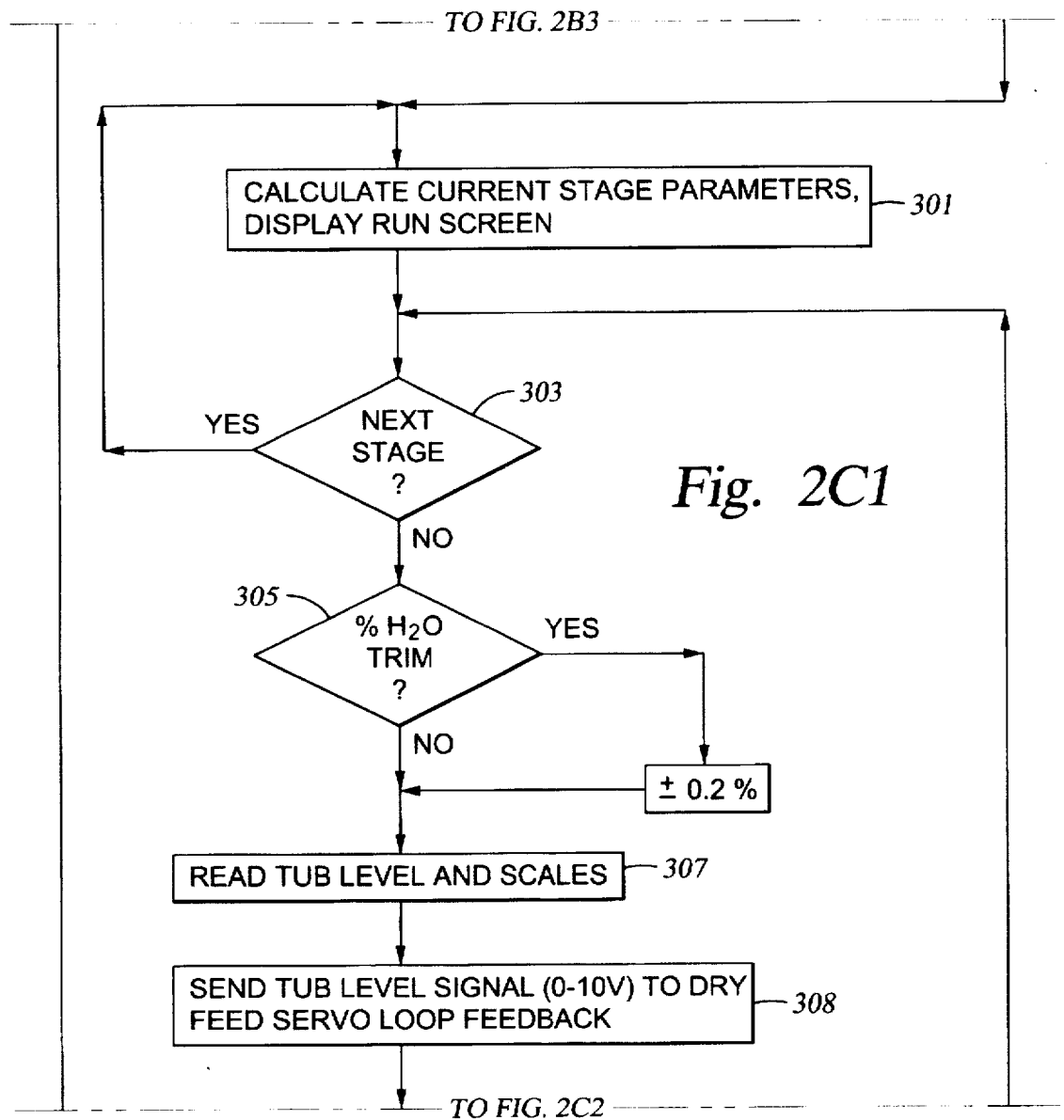
Fig. 2C1

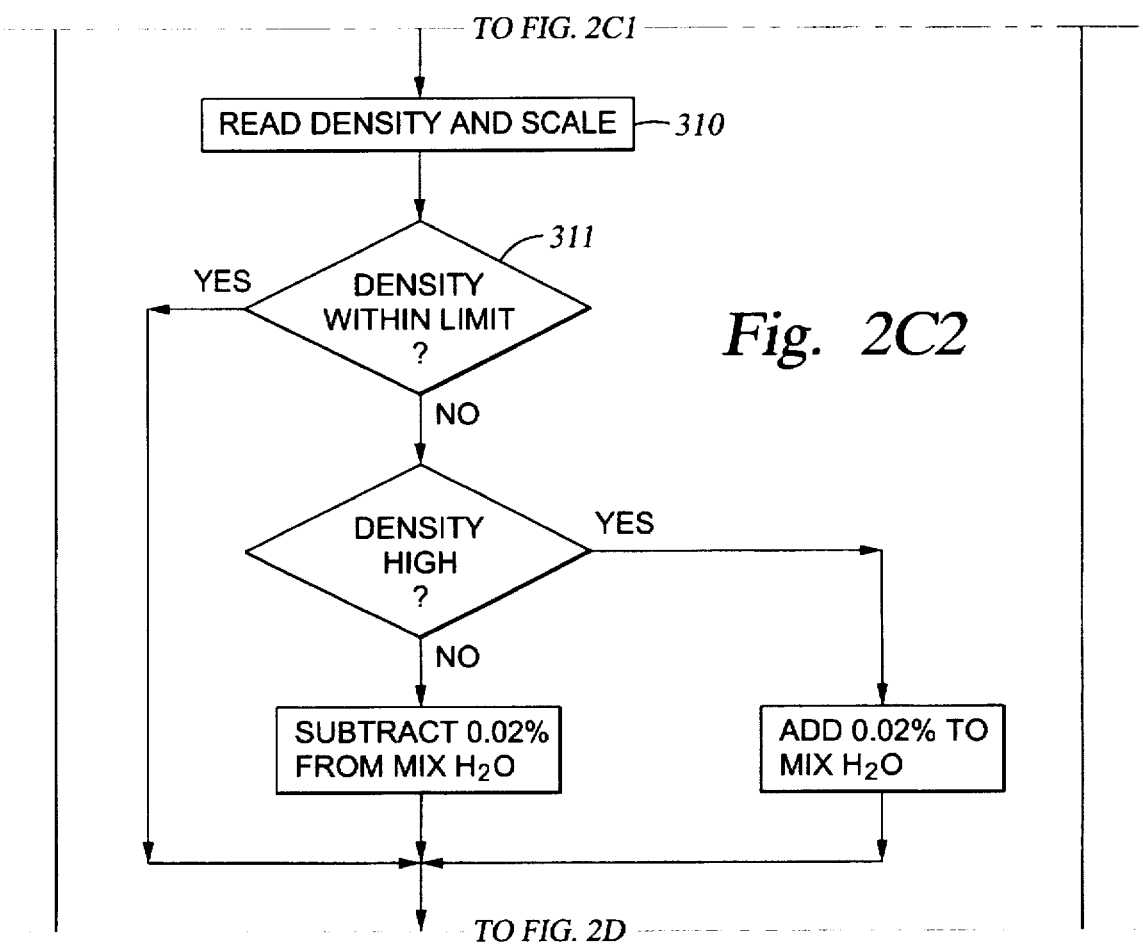
Fig. 2C2

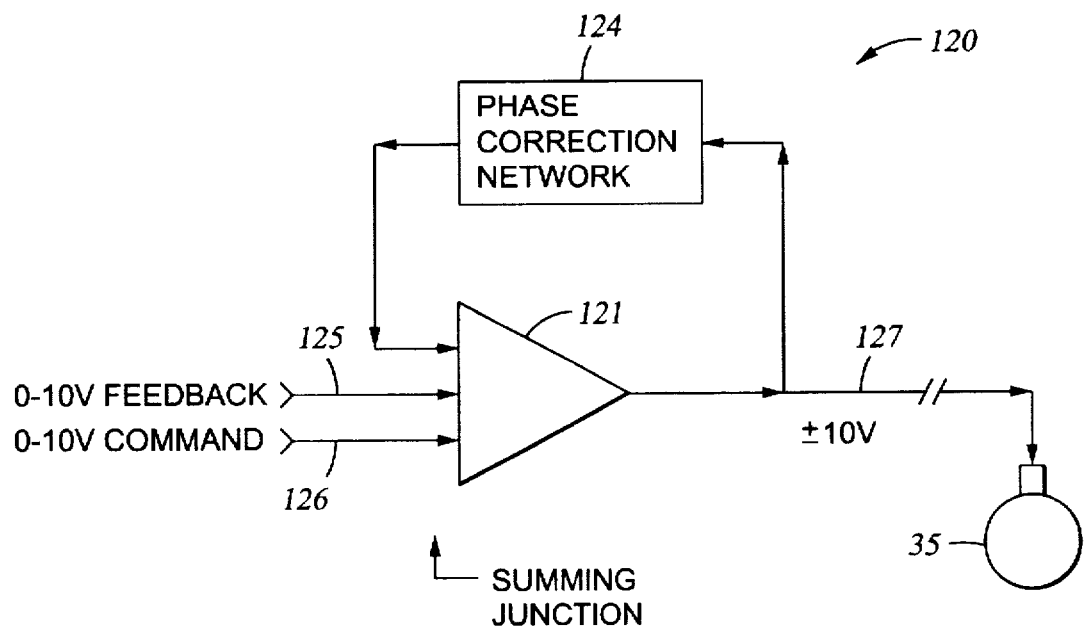
*Fig. 2E-A*
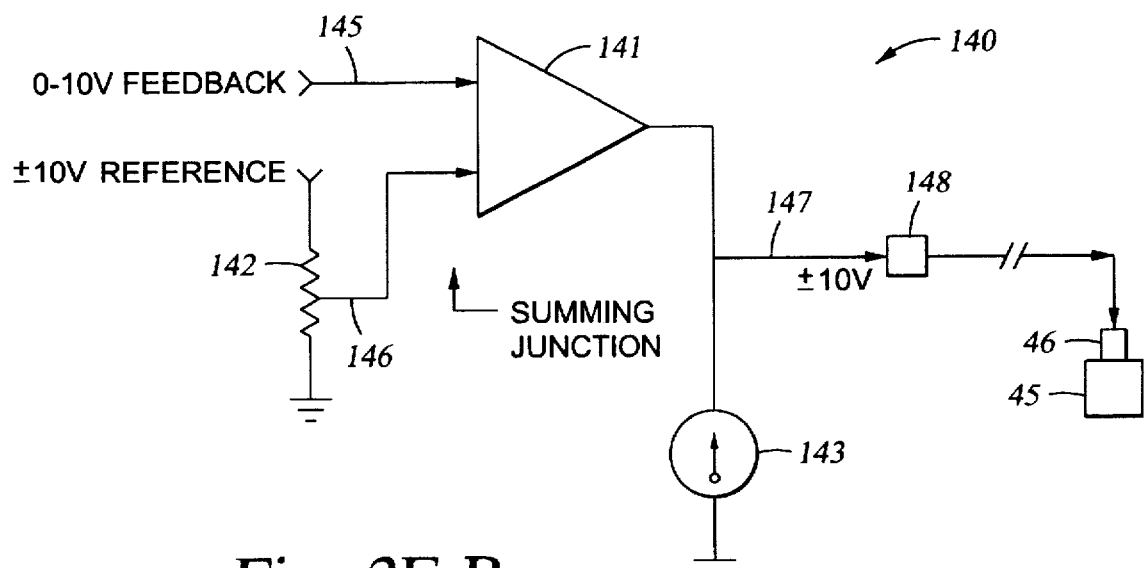
*Fig. 2E-B*

AUTOMATIC CEMENTING SYSTEM WITH IMPROVED DENSITY CONTROL

CROSS-REFERENCE TO RELATED APPLICATIONS

This invention is a continuation-in-part of U.S. patent application Ser. No. 08/394,476 filed Feb. 27, 1995, now U.S. Pat. No. 5,629,182 which is a continuation-in-part of U.S. patent application Ser. No. 08/178,659 filed Jan. 7, 1994 (now U.S. Pat. No. 5,503,473), which is a continuation-in-part of now abandoned U.S. patent application Ser. No. 07/969,944, filed Oct. 30, 1992, which is a divisional application of U.S. patent application Ser. No. 07/389,923, filed Aug. 2, 1989 (now U.S. Pat. No. 5,281,023). Co-pending U.S. patent application Ser. No. 08/394,476 filed Feb. 27, 1995 is also a continuation-in part of U.S. Ser. No. 08/308,477, filed Sep. 19, 1994, which is a file wrapper continuation of now abandoned U.S. patent application Ser. No. 07/969,944, filed Oct. 30, 1992.

STATEMENT REGARDING FEDERALLY SPONSORED RESEARCH OR DEVELOPMENT

Not applicable.

BACKGROUND OF THE INVENTION

The invention disclosed herein relates generally to an apparatus and method for obtaining a slurry with a desired density during a continuous-mixing operation. More particularly, the invention relates to an automated system for automatically controlling the density of a cement slurry with a very high degree of precision for use in well completions.

Systems for mixing dry cement with water are well known in the art. Typically, cement mixing for large jobs is either done by batch-mixing or by continuous-mixing. A batch-mixing operation occurs when the ingredients are mixed in a large tank or blender to obtain the entire volume of cement slurry before the start of the job. A continuous-mixing job, conversely, is an operation in which the ingredients are continuously mixed during the course of the job to produce a slurry for immediate use. The advantages of batch-mixing cement is that the density can be controlled very accurately. The disadvantage is that batch-mixing may prove to be impossible or impractical on large jobs in which a large volume of cement slurry must be generated. Because the slurry is premixed in a batch job, a blender or tank must be provided that is large enough to hold all of the slurry to be used on that particular job. Continuous mixing alleviates this problem, in that the slurry is mixed "on the fly" in a relatively small mixing chamber and is used immediately.

One problem, however, with continuously mixing the slurry is that it is very difficult to control the density of the slurry with any degree of precision because ingredients are constantly being added and slurry is constantly being discharged. As a result, it is common to have fluctuations in slurry density during continuous-mix operations. In certain applications, cement density fluctuation can cause severe problems. One example where cement density fluctuations are particularly undesirable is in cementing operations for casing a wellbore. The density of cement is especially critical for such cementing operations.

Cement is used in wells to secure casing in place in a wellbore to "complete" the well. The purpose of the cement is to seal and block various zones between the casing and the wellbore. Special additives may be mixed with the cement to alter specific properties of the cement, as required by the wellbore and casing characteristics and relationships. A general overview of cementing casing may be found in Skinner, D. R., *Introduction to Petroleum Production*, Volume I, Chapter 4: Well Completion (Gulf Publishing Co. 1981), and in Moore, Preston L., *Drilling Practices Manual*, Chapter 16 (PennWell Publishing Co. 1974).

Several terms commonly are used in cementing operations, as follows:

Cement Slurry refers to the mixture of dry or powdered cement and water that is injected or pumped into the wellbore;

Slurry volume refers to the volume of slurry that is obtained when a given volume of dry cement is mixed with a given volume of water; and Slurry density is the weight of a given volume of mixed slurry, and typically is measured in terms of pounds per gallon (also referred to as "PPG");

Different cements cure in different ways; for example, some cements expand as they cure, while others shrink. During the curing process, cement generally increases in temperature. Some cement mixtures will become weak or increasingly permeable as a result of this increase in temperature during the curing process. Because the heat of the earth increases at greater depths, degradation of the cement becomes more pronounced as the depth of the wellbore increases if cement is used downhole in wells.

The cement and water typically are mixed on site during a cementing operation because most wells are located in remote locations where it is impractical to use large mixing tanks. Such an application commonly is referred to as a continuous-mixing job. The materials used in the cement are usually prepared dry and transported to the well site, where it is mixed with liquid or "mix water" and pumped into the well. Various dry or liquid additives also may be added to either the mix water or to the dry cement as desired to alter the properties of the cement slurry. The cement slurry normally is pumped in liquid form into a wellbore by pumping the slurry down the interior of the casing and forcing the slurry to flow from the bottom of the casing back upward between the casing and the wellbore. After the cement has been pumped into the wellbore, it must be allowed to cure for a certain period of time that can vary between 12–72 hours.

By evaluating the wellbore and formation characteristics, a person skilled in the art can determine with a good deal of precision the preferred cement density to use during the cement job to most effectively protect the casing and separate producing formations. If a cement slurry density could be maintained within a tight tolerance of ±0.1 lbs/gallon (PPG) of the preferred density, the probability of a successful cementing operation would be much higher. Some authors have stated that proper mixing of the cement slurry is critical to successful completion of a cementing job on a well, and have proposed systems to alleviate this problem with density control in continuous-mixing operations. See e.g. Galiana, et. al., "Cement Mixing: Better Understanding and New Hardware," *Oilfield Review*, (April 1991); Hitt, et. al., "Process Control of Slurry Density: Impact on Field Performance of Slurry Density," presented at the Society of Petroleum Engineers' Production Operations Symposium held in Oklahoma City, Okla. Apr. 7–9, 1991; O'Neill, et. al., "New Slurry Mixer Improves Density Control in Cementing Operations," presented at the Society of Petroleum Engineers' Latin America Petroleum Engineering Conference held in Rio de Janeiro, Oct. 14–19, 1990; Wienck, et. al., "Automatic Control of Bulk Cement Tank Levels," presented at the 24th Annual Offshore Technology Conference in Houston, Tex., May 4–7, 1992; and Stegemoeller, et. al., "Automatic Density Control and High Specific Mixing Energy Deliver Consistent High-Quality Cement Slurries," presented at the 24th Annual Offshore Technology Conference in Houston, Tex., May 4–7, 1992.

Unfortunately, the prior art continuous-mix cementing systems have been unable to guarantee the density of the cement slurry within an acceptable tolerance level. Most prior art cementing systems are subject to a wide fluctuation in cement slurry density. See the discussion in Galiana, et. al., "Cement Mixing: Better Understanding and New Hardware," *Oilield Review*, (April 1991). Even the systems developed more recently have encountered difficulty in obtaining a slurry density within ±0.1 lbs/gallon. Id. One of the reasons for this variance is that the meters and valves used in the mixing and density control systems typically are designed to be within a predetermined accuracy. Consequently, a certain amount of error is common in most meters. This is especially true with respect to the dry cement delivery system. Compounding this problem is the fact that many density control systems attempt to obtain a desired density by fixing the amount of dry cement to be delivered, while adjusting the rate at which water is input based upon feedback from a density sensor. See e.g. Stegemoeller, et. al. "Automatic Density Control and High Specific Mixing Energy Deliver Consistent High-Quality Cement Slurries," presented at the 24th Annual Offshore Technology Conference in Houston, Tex., May –7, 1992. The meters and valves associated with the dry cement delivery system have a relatively large error associated with them that makes any control system suspect that is based upon setting the delivery of dry cement to a fixed level. This error results from a number of factors such as the tendency of the dry cement to coagulate. Because of the difficulty in handling and supplying dry cement during a cementing operation, it is very difficult to maintain a constant slurry density.

Because of the inherent inaccuracy in all of the meters and valves typically used in an automatic density system, and especially those related to the dry cement delivery system, it is extremely difficult to design a system that can very accurately and precisely control the density of a cement slurry. It is an object of the present invention to automatically control the density of the cement slurry obtained in a continuous-mixing application to within ±0.1 lbs/gallon (PPG) of the desired density for cementing operations that is relatively independent of the error inherent in the meters and valves used in the system and especially those related to the dry cement delivery system.

BRIEF SUMMARY OF THE INVENTION

The present invention comprises a system and method for automatically and precisely controlling the density of a cement slurry. The invention preferably includes a fresh water input device, such as a pump or a valve, and a dry cement delivery system, supplying mix water and cement, respectively, to a mixing chamber. The mixing chamber combines the mix water and cement to obtain a cement slurry that is discharged through a discharge line to a well or other desired location. The rate and amount of slurry being discharged is measured by a discharge flow meter. The input mix water line includes a flow meter, and the dry cement delivery system includes a valve or other device for regulating the amount of dry cement delivered to the mixing chamber. Additionally, the mixing chamber preferably includes a sonic level sensor for monitoring the level of the slurry in the mixing chamber.

The system controller also preferably receives as inputs from an operator (1) the desired or target slurry density in pounds per gallon (PPG); (2) the density of the input mix water in PPG; and (3) the absolute density of the dry cement, in PPG.

The discharge line of the system preferably includes a discharge valve and a discharge flow meter. The discharge flow meter provides an indication of the rate at which slurry is being discharged. With this information, and the information provided by the operator, the controller determines the percent by volume of dry cement in the cement slurry. In other words, the controller determines how much dry cement is leaving the system as part of the cement slurry. Once the percent by volume of dry cement is known, the controller then determines the percent by volume of liquid in the cement slurry. After the controller determines the percent by volume of liquid in the slurry, the controller calculates the amount of liquid that must be supplied to the system through the input line to maintain the correct water/slurry ratio. This calculation is made by multiplying the discharge rate by the percent by volume of liquid in the slurry. In this manner, the controller insures that the same amount of liquid is flowing into the system as is flowing out as a component of the cement slurry. Once the controller determines the proper input rate of liquid into the system, the controller adjusts the input pump or input valve to provide the mix water at the required rate. The input flow meter is used as feedback to bring the input water device to the proper speed or position.

Dry cement is added so as to maintain a constant level in the mixing tub. The cement is not added at a fixed volume ratio, therefore variations in the apparent dry cement density are not critical.

The mixing chamber preferably comprises a divided tub, with Chambers A and B, for 5 receiving water and dry cement, with the discharge line connected to the chamber B. In addition, the sonic level sensor is preferably provided to monitor the change in slurry level in chamber B. In this embodiment, the controller continues to adjust the speed or position of the dry cement control valve as described above such that the level of slurry in chamber B remains constant.

The invention also preferably includes a recirculation line to permit the density of the slurry to be brought to the desired density before it is discharged, and before automatic operation begins. The recirculation line includes a density meter for measuring the density of the cement slurry and for providing an indication of that density to the system controller.

These and other advantages and details of the invention will become apparent from a review of the Detailed Description which follows.

BRIEF DESCRIPTION OF THE DRAWINGS

For a detailed description of the preferred embodiment of the invention, reference will now be made to the accompanying drawings, wherein:

FIGS. 2A–2D illustrate a flow chart of the operation of the ACS system of FIG. 1;

FIGS. 2E-A and 2E-B illustrate the mix water and dry feed servo-loops, respectively;

DETAILED DESCRIPTION OF THE INVENTION

Figure 1:
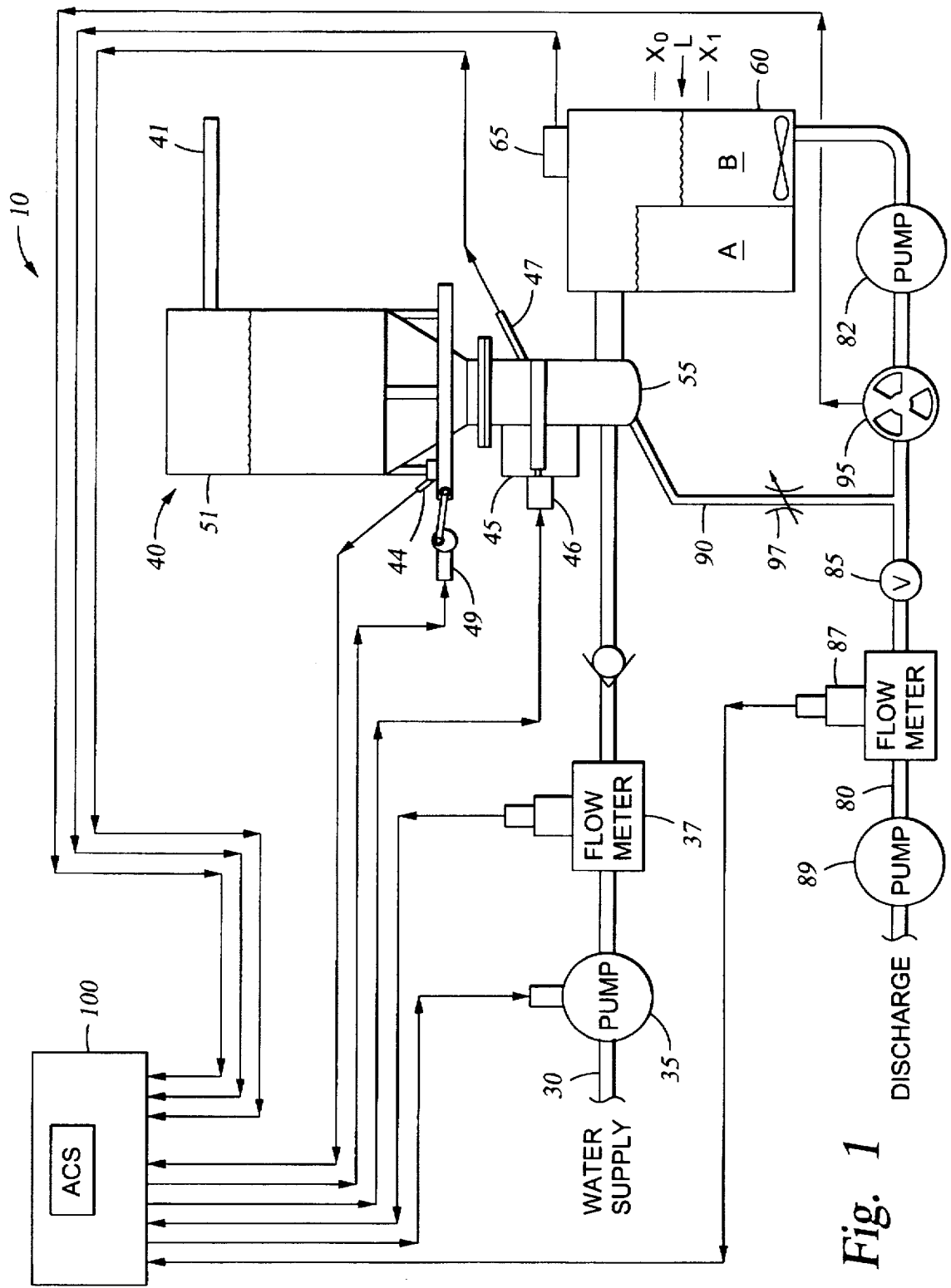
FIG. 1 is a schematic illustration of the configuration of the Automatic Cementing System ("ACS") of the preferred embodiment.

Referring now to FIG. 1, the Automatic Cementing System ("ACS") 10 constructed in accordance with the preferred embodiment generally comprises an input (or "mix") water supply line 30, a dry cement source 40 for supplying dry cement, a mixing chamber 60 for mixing dry cement and water, a cement slurry discharge line 80, a recirculating slurry line 90, and a system controller 100 for receiving output signals from the various system components and for providing control signals to regulate the operation of the ACS system.

The input water supply line 30 preferably provides mix water (or other base liquid) to the mixing chamber 60 for mixing with the dry cement from source 40. The water supply line 30 preferably includes a fresh water pump 35, an input flow meter 37, and a mixing bowl 55 for receiving dry cement from hopper 51 of source 40. Water pump 35 is preferably a speed-controlled positive displacement pump. Similarly, mixing of the cement and water can take place in a jet mixer instead of a mixing bowl 55. The water/cement mixture preferably flows from mixing bowl 55 (or jet mixer) into mixing chamber 60.

In the preferred embodiment, the input flow meter 37 comprises turbine flow meter such as Model No. 991.7030 manufactured by the Halliburton Company. The pump 35 preferably connects electrically to the system controller 100 for receiving control signals. The input flow meter 37 preferably connects electrically to the system controller 100 and provides an electrical signal to the controller 100 that is indicative of the flow rate of mix water into the mixing chamber 60. Preferably, the input flow meter has an accuracy of 0.50% The water supply line 30 preferably connects to a fresh water supply (not shown), which may be mounted on a truck, or which may comprise a water tower or other available water source capable of generating the required volume at the required rate.

Dry cement source 40 for providing dry or powdered cement to the mixing chamber 60 preferably comprises a hopper 51 that includes a supply conduit 41, a weight sensor 44, a valve 45, and manual, air-operated, fluidization pads 49. As one skilled in the art will immediately realize, many other delivery systems may be used without departing from the principles of this invention. For example, a vibrator may be used instead of the fluidization pads to insure uninterrupted flow of cement into the valve 45. The hopper 51 receives the dry cement through conduit 41, which connects the hopper 51 to a source of dry cement (not shown). In accordance with conventional techniques, dry additives may be combined with dry cement either before or during the mixing operation. In addition, to insure a good flow of dry cement through conduit 41, the dry cement preferably is blown through conduit 41. The hopper 51 also preferably includes a weight sensor 44 for determining the amount of cement in the hopper 51 by weight. Weight sensor 44 preferably comprises a load cell, and is preferably electrically connected to the controller to give the operator a real-time weight indication so that hopper 51 can be reloaded appropriately.

Valve 45, or other suitable regulating device, controls the amount of cement that is delivered to mixing bowl 55. In accordance with conventional techniques, the dry cement is dropped on top of the water being injected through input line 30, at mixing bowl 55. Although not required in the preferred embodiment, a jet nozzle (not shown) may be provided on the input line 30, just upstream from the mixing bowl 55. The cement/water mixture then flows into the mixing chamber 60 where further mixing occurs. Other alternative mixing arrangements can be used, however, without departing from the principles of the present invention.

In the preferred embodiment, the valve 45 comprises a slide-gate valve, with a control valve 46, that can be externally regulated to actuate slide-gate valve 45. The control valve 46 of valve 45 preferably connects electrically to the system controller 100 for receiving electrical signals that are used to regulate the position of valve 45 in order to control the rate at which dry cement is delivered to the mixing chamber 60. As will be understood by one skilled in the art, various other valves, controllers and sensors could be used without departing from the principles of the present invention. For example, a rotary valve and feedback device 47 such as a tachometer may be used in place of a slide-gate valve. The speed of the rotary valve then would be monitored by feedback device 47 to determine the approximate volume of the cement being delivered.

The mixing chamber 60 receives mix water from the input supply line 30 and dry or powdered cement from the dry cement hopper 51, and mixes the water and dry cement to obtain a cement slurry. Other chemicals or additives also may be supplied to the mixing chamber 60, as desired. Mixing chamber 60 preferably includes two divided chambers, Chamber A and Chamber B, to define a weir divider for removing entrained air according to well known principles. Chamber B includes a mixer for mixing the cement and water.

The mixing chamber 60 preferably is constructed so that the cement and water are discharged into Chamber A when it is first mixed. As Chamber A becomes full, the slurry pours over into Chamber B. The discharge line 80 preferably connects to the lower side of Chamber B. In the preferred embodiment, a tub level sensor 65 is provided for measuring the slurry level of Chamber B. This tub level sensor 65 preferably comprises a sonic level sensor such as Model No. PCUB30M72AI as manufactured by Electro Corporation, although other level sensors as are known in the art may be used successfully. Chamber B is constructed so that it is relatively deep, while having a relatively small cross-section area. Obviously, other dimensions could also be used without departing from the principles of the present invention. By constructing Chamber B with a relatively small cross-section, changes in slurry level in Chamber B will be more pronounced, and thus will be more easily detected by the level sensor 65.

The discharge line 80 preferably receives cement slurry from the lower side of Chamber B and supplies the slurry to the well site. The discharge line 80 includes a discharge flow meter 87 for measuring the rate at which slurry is discharged, a manually controlled discharge pump 82, and a discharge valve 85. In the preferred embodiment, the discharge flow meter 87 comprises a non-intrusive sensor, such as a magnetic flow meter, capable of an accuracy within 0.5%. A suitable flow meter 87 is Model No. 10DX3311AAL15P1A78A11Z2X1AABH1 as manufactured by Fischer Porter Company. The discharge flow meter 87 preferably connects electrically to the system controller 100 to provide an output signal that is indicative of the flow rate of cement slurry through discharge line 80. The discharge pump 82 preferably comprises a centrifugal pump that is manually controlled by the operator. One or more triplex pumps 89 also may be provided downstream in the slurry discharge line 80 in accordance with conventional techniques. The triplex pumps are manually regulated by the operator and normally are run at various speeds.

The discharge valve 85 works in conjunction with recirculation line 90. When discharge valve 85 is closed, cement slurry is forced to flow through the recirculation line 90. The recirculation line 90 preferably connects between the discharge line 80 and the mixing bowl 55. The recirculation 90 preferably performs two separate functions. First, the recirculation line 90 enables the system to bring the cement slurry to the desired density before discharging begins. Second, during the time that cement is being discharged, the amount of slurry recirculated is regulated by the recirculation valve 97. This recirculated slurry adds energy to the mixing process in the mixing bowl 55 and tends to dampen slurry density fluctuations in the mixing chamber 60. The recirculation valve 97 is a throttling type valve and regulates the amount of slurry recirculated. It is used in conjunction with pump 82, which always runs at full speed, to control the discharge pressure in line 80. In the preferred embodiment, a nuclear density meter 95, which preferably has an accuracy within ±0.1 PPG for precisely measuring the density of the cement slurry, is preferably located immediately downstream from pump 82 and before the recirculation line connection. A suitable density meter 95 is Model No. SGD-0-4 as manufactured by the Texas Nuclear Division, Ramsey Engineering Company.

Alternatively, one skilled in the art will understand that the present invention can be used without a recirculation line or alternatively, no density meter need be included. If no density meter is included, then the density of the cement slurry may still be obtained through the use of the input flow meter and discharge flow meter, as disclosed in pending application, U.S. Pat. No. 5,441,340, the teachings of which are incorporated herein by reference in their entirety. Alternatively, the density of the slurry may be measured by taking and testing samples.

The system controller 100 preferably comprises a microprocessor-based unit for orchestrating the operation of the ACS system. In the preferred embodiment, Motorola's 68HC11 is used as the microprocessor. The controller 100 preferably includes an input, such as a keyboard or operator panel, through which system parameters can be input by an operator. Also in the preferred embodiment, the system controller 100 may include one or more read-only memory (ROM) units for storing data loaded into the controller 100 prior to the start of a cement job. The controller 100 also preferably includes an output for displaying to the operator certain critical system parameters. Preferably, the input and output of the controller 100 are designed so that the operator is guided by a menu driven display to insure that all necessary information is provided by the operator.

Figure 6:
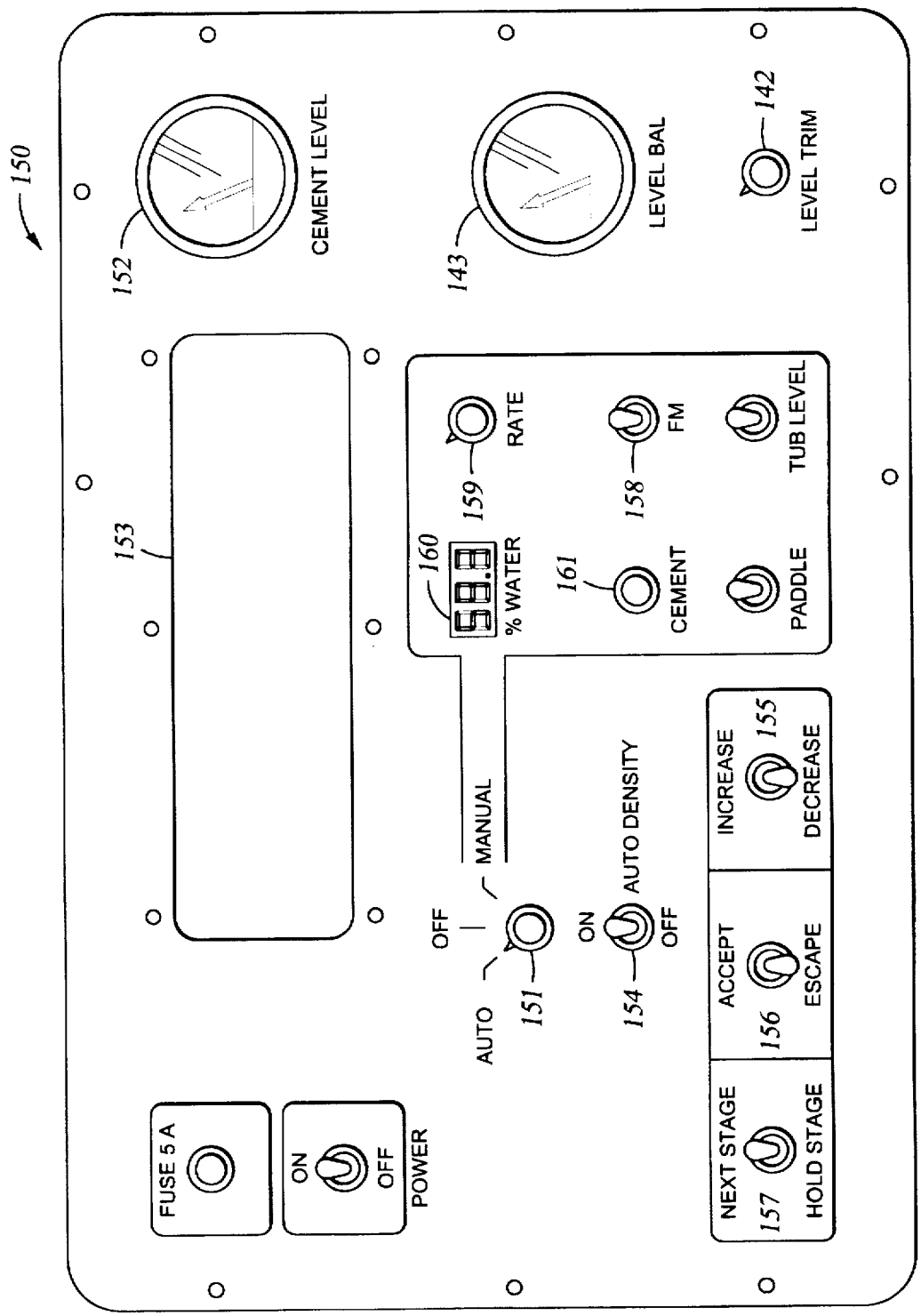
FIG. 6 is a layout of the ACS system front panel.

Referring now to FIG. 6, there is shown a front panel 150 in accordance with the preferred embodiment, which includes a display 153 for providing information to the operator; Auto/Off/Manual switch 151; auto density switch 154; switches 155-157; level set potentiometer 142; weight meter 152; and tub level meter 143, which is of a type commonly known in the art as a "null meter".

In addition to the front panel 150 and devices shown thereon, the system controller 100 preferably connects electrically to at least the following devices: (a) the input flow meter 37; (b) the sonic level sensor 65; (c) the density meter 95; and (d) the discharge flow meter 87, for receiving electrical output signals from each of these sensors. The system controller 100 also connects electrically to the feedback device 47 if a rotary valve is used in place of slide-gate valve 45. These signals from each of the sensors are processed as described more fully below to permit automatic operation of the ACS.

The system controller 100 also preferably connects electrically to at least the following: (a) the fresh water pump 35; and (b) the control valve 46, for providing output control signals to each of these components. The controller 100 automatically adjusts the speed or position of the fresh water pump 35 and the valve 45 to fine-tune the density of the slurry, as will be described more fully below.

Referring additionally to FIGS. 2E-A and 2E-B, the system controller 100 also preferably connects to a mix water servo-loop 120 and a dry feed servo-loop 140. The mix water servo-loop 120 is a conventional servomechanism using an operational amplifier ("op-amp") 121 in conjunction with a phase correction network 124 to generate a control signal 127 control the speed of fresh water pump 35 in response to feedback and command signals (125 and 126) conditioned by system controller 100, as will be described further below. Phase correction network 124, well known in the art, is used to stabilize mix water servo-loop 120. This is required because of the rotational inertia of pump 35, the time lag caused by hoses swelling under pressure, and the time delay in the response of any mix water valves (if used).

Likewise, the dry feed servo-loop 140 is a conventional servomechanism using an op-amp 141 to generate a control signal 147 to control the dry cement feed rate (by regulating control valve 46 which drives slide-gate valve 45) in response to a +10 V reference voltage and a feedback signal 145 conditioned by system controller 100. The dry feed servo-loop incorporates the level set potentiometer 142 (in reference leg 146) and the tub level meter 143 previously described with respect to FIG. 6. The output of dry feed servo loop 140 is connected to a threshold detector 148, which in turn is connected to control valve 46 which drives slide-gate valve 45.

I. Operation of System Controller

Figure 2D:
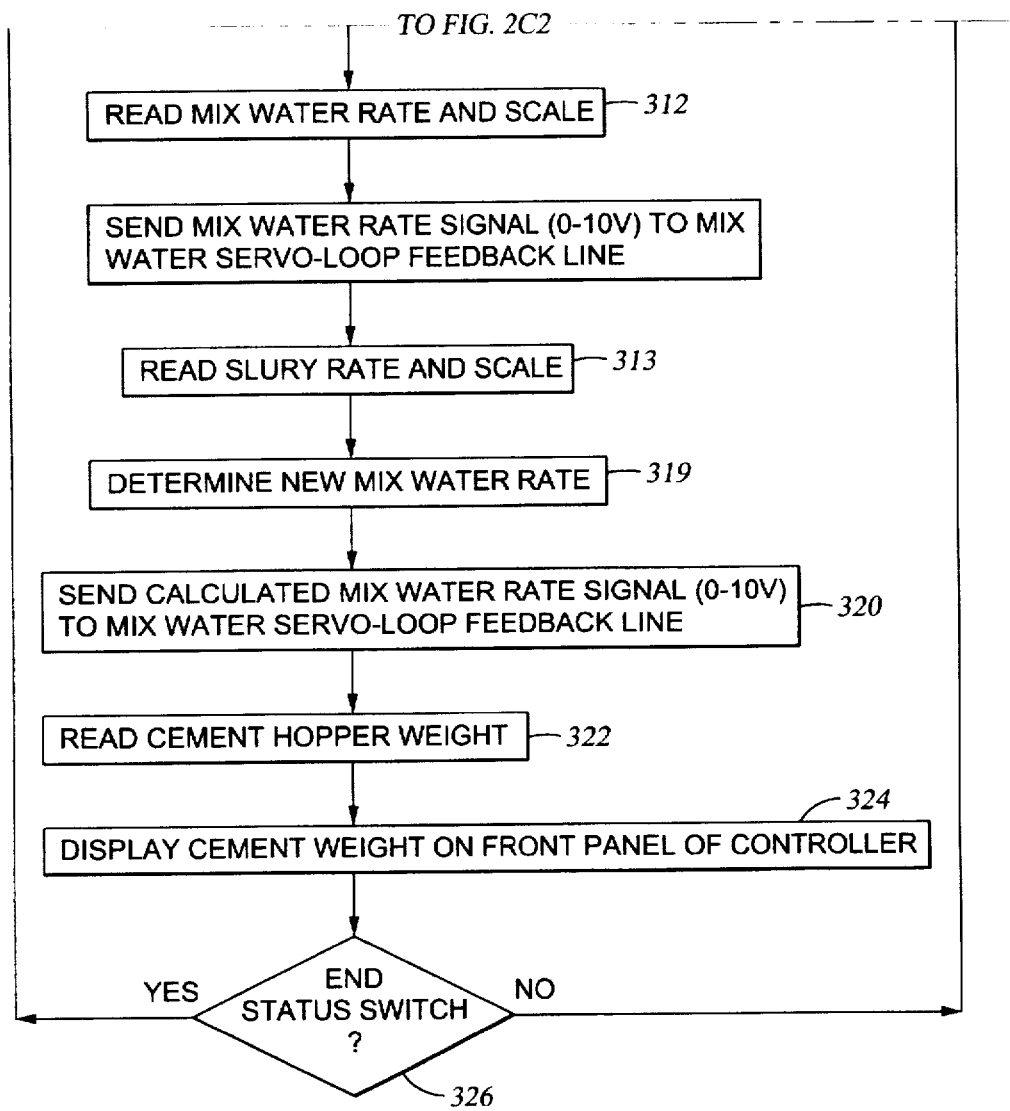
Figure 3:
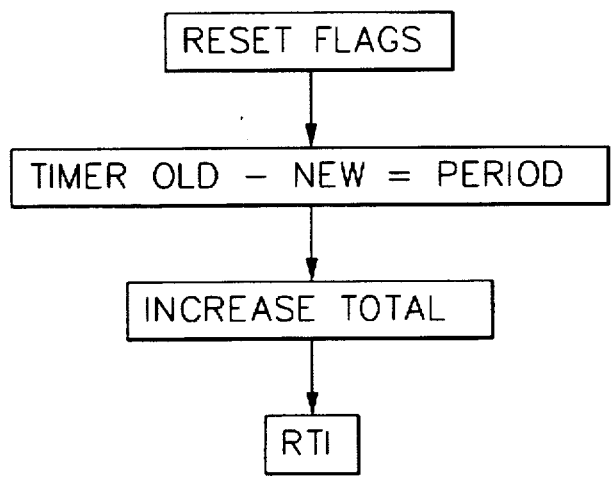
FIG. 3 is a flow chart showing how the rate and total volume of the mix water is measured.
Figure 4:
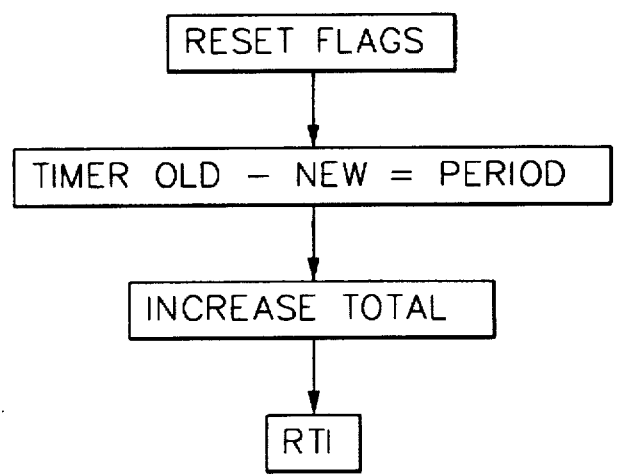
FIG. 4 is a flow chart showing how the rate and total volume of slurry discharged is generated.

Referring now to FIGS. 2A-2E, the operation of the system controller 100 will be discussed in accordance with the preferred embodiment. In the preferred embodiment, the system controller 100 provides a menu display to the operator to guide the operator through both the main menu and through each step of the options. As shown in FIG. 2A, the system controller initially provides the operator with three options as part of a main menu: (1) run the ACS (Run ACS); (2) calibrate and set-up the ACS (Calibrate Setup); or (3) enter job data into the ACS (Job Data Entry). The source code (listed below) for the preferred programming of the controller 100 comprises five modules that are linked when they are compiled to create the executable object code.

A. Entering Job Data

If the operator selects the Job Entry Data selection on the main menu, the controller will ask in step 202 whether the operator wishes to clear all stage data, or whether the operator wishes to edit existing data. It should be understood that the operation of the ACS could include a number of stages, with a stage being defined as any change in operating conditions, including a change in the cement slurry's target density, a change in the density of the input fluid, or a change in the density or type of dry cement that is used. Thus, for example, if it is desired to change from a target slurry of 16.0 PPG to 16.3 PPG, a different stage would be involved. Similarly, if it was desired to add liquid additives to the input water after operations had begun, thus changing the density of the input liquid, a different stage would be defined. Changing from one stage to the next could be preprogrammed into the system controller 100 by, for example, specifying the volume (either input or discharge) at which the stage was to change, or could be done manually by having the operator designate a change in stage by activating a switch. In either instance, the stage parameters could be preprogrammed into the controller 100.

The first display that will appear to the operator after the stages are cleared, or if the edit option is chosen, is a request, in step 204, to input the desired or target density, preferably in pounds per gallon (PPG), for the cement slurry for that particular stage. As one skilled in the art will realize, other measurement units may be used without departing from the principles of this invention. In the preferred embodiment, an increment and decrement switch is used to set the desired setting. Obviously, other input procedures could be used without departing from the scope of the present invention. After the target density for the cement slurry is entered for a particular stage, the controller prompts the operator in step 206 to enter the density in PPG of the input fluid for that particular stage, again through the use of the increment and decrement switches. The controller next requests in step 208 information regarding the true and apparent densities of the dry cement (in PPG) for that particular stage.

Once these three items are entered by the operator, the controller in step 210 asks the operator if there are other stages to be entered at this time. If there are, then the controller cycles back through the menus to obtain the necessary information. When all stages have been entered, the controller permits the operator to review the information entered, by stage, and make any necessary changes. When review is complete, the controller returns to the main menu which again is displayed to the operator.

B. Calibrating and Setting Up the System

The selection of Calibrate Setup (step 212) from the main menu allows the operator to:

Set k factors and scale the mix water flow meter 37 and feedback device 47 (if a rotary valve is used in place of slide-gate valve 45).

Set and scale 0.004–0.020 amp current loops for the discharge flow meter 87, density meter 95, and tub level sensor 65.

Set the date and time.

Selection of "Set k Factors" in step 215 allows the operator to change certain operating parameters or to calibrate the input mix water flow meter 37. For example, if the input flow meter 37 provides one hundred output pulses to signify to the controller 100 that 10 gallons/minute are flowing through the meter, the operator could recalibrate the controller to interpret the 100 pulses from the input flow meter to mean that 10.5 gallons/minute are flowing through the meter. The operator, therefore, can adjust the k factor of the input meter. This calibration feature enables the various sensors to be pre-tested and finely tuned for accuracy. In addition, if a new meter is substituted, the meter can be quickly and accurately calibrated through the use of this software option.

If a rotary valve and feedback device 47 are used in place of slide-gate valve 45, the feedback device 47 is calibrated in a manner similar to that described above with respect to input flow meter 37.

Selection of "Set Current Loops" in step 213 allows the operator to calibrate the density meter 95, discharge flow meter 87, and tub level sensor 65 by, for example, adjusting their respective zero point and span or bias.

Step 217 allows the operator to adjust the density meter 95 if necessary. The operator can adjust the controller 100 so that the maximum output from the density meter 95 represents a specific density value. The operator can also recalibrate controller 100 so that the lowest output from density meter 95 represents a zero density value. Thus, for example, if the density meter provides an output that ranges between 0.004 to 0.02 amps, the controller would correlate the 0.004 amps to a zero density, and would correlate the 0.020 amps to the maximum density value, for example, 20.0 PPG. Similarly, step 216 adjusts the discharge flow meter 87, and step 218 adjusts the tub level sensor 65.

Selection of "Set Time" in step 214 allows the operator to set the current time into the system controller 100. The time is set by moving the cursor over a clock digit and decrementing the digit until the desired entry is displayed. Once all the digits are entered, the operator selects "Accept" to store the new time. The time will be stored and updated even though the system controller's power is not on.

After all the above mentioned steps are complete, the system controller 100 again displays the main menu to the operator. If at any time during the calibration/setup procedure the operator desires to leave this mode switch 156 (FIG. 6) can be pressed to "Escape", sending the operator back to the main menu.

C. Run Mode

Prior to automatic operation, a cement batch with a correct stage 1 density must be made up at an approximately correct tub level. This is accomplished with the system controller 100 set to "Run ACS" (step 300) and the "Auto/Off/Manual" switch 151 (located on the front panel 150 of the controller, as shown in FIG. 6), set to "Manual". Referring to FIGS. 2E-B and 6, the level set potentiometer 142 on front panel 150 is then manually adjusted until the level meter 143 indicates zero. This sets the tub level control point for the dry feed servo-loop circuit 140 shown in FIG. 2E-B. The dry feed servo-loop gain is pre-adjusted during initial installation and setup, using standard procedures well known in the art, so that the tub level will remain constant to within +/− one inch of the setpoint level.

The purpose of the above procedure is to accurately set the mix water flow rate as a percentage of the slurry discharge rate so that a desired slurry density can be achieved by adding cement to maintain a constant tub level. The mix water as a percentage of slurry is determined from:

$$X = \frac{(\text{target } PPG) - (\text{cement true density } PPG)}{(\text{mix water density } PPG) - (\text{cement true density } PPG)} \times 100$$

$$Y = (1 - X) \times \frac{(\text{cement true density } PPG)}{(\text{cement apparent density } PPG)} \times 100$$

Where X and Y are the percentages of mix water and concrete in the slurry by volume, respectively.

If the operator selects the "Run ACS" option off of the Main Menu (step 300), and the Auto/Off/Manual switch 151 is set to "Manual", the operator can then manually adjust controls provided on front panel 150 to increase or decrease the dry or water valve flow rates. When Auto/Off/Manual switch 151 is moved to the "Auto" position, the system controller 100 begins automatic operation and disables the manual controls.

In step 301, the controller calculates the current stage and running parameters, and then displays a screen for the operator. The displayed screen preferably includes mix water flow rate, discharge flow rate, target density, actual density measured by the density meter 95, the stage, the total discharge, the stage discharge, and the time.

The system controller 100 uses cement true density, cement apparent density, and mix water density to calculate the percentage of mix water (by volume) in the slurry for the current stage, as described above. The result is then used to set the mix water rate as a percentage of the slurry discharge rate.

After the screen is displayed (or updated), the controller 100 determines in step 303 if the operator has requested that the system proceed to the next stage. This preferably is done by depressing a pre-selected switch such as switch 157 in FIG. 6, for a predetermined minimum time.

In step 305, the controller 100 determines whether the mix water trim switch 155 has been activated to either the "increase" or "decrease" position. If switch 155 has been activated, the controller 100 adds or subtracts, respectively, a predetermined amount to the mix water rate. As explained in more detail below, the trim feature allows the operator to manually alter the mix water/dry cement ratio.

In step 307, the controller 100 reads the tub level measured by tub level sensor 65 and scales that measurement to a physical unit (preferably inches, although other units may of course be used) for future reference. Using the scaled value, controller 100 then generates a voltage signal between 0 and 10 volts as the tub level feedback signal 145 to the dry feed servo-loop 140 (FIG. 2E-B). At clocked intervals, preferably at least once per half second, a new tub level value is obtained from level sensor 65 and feedback signal 145 is updated.

In step 308, the controller 100 checks the tub level measurement against preset limits through the dry feed servo-loop 140. If the tub level is too low, op-amp 141 imposes a +10 volt signal at line 147 to threshold detector 148. If the tub level is too high, op-amp 141 imposes a -10 volt signal at line 147 to threshold detector 148. If threshold detector 148 receives a voltage signal greater than +2 volts, it actuates control valve 46 to open slide-gate valve 45 and increase the dry delivery rate to fill up the tub. If threshold detector 148 receives a voltage signal less than -2 volts, it actuates control valve 46 to close slide-gate valve 45 and decrease the dry delivery rate. If a rotary valve is used in place of slide-gate valve 45, a similar procedure is followed except that the dry feed servo-loop 140 then controls the speed of the rotary valve rather than the actuation of the control valve 46/slide-gate valve 45 combination.

In step 310, the controller 100 reads the density measured by density meter 95 and scales that measurement to a physical unit (such as pounds per gallon). These data are used in the operator display and in step 311 below.

In step 311, the controller determines if the density is within acceptable limits. In the preferred embodiment, a switch is provided that permits the operator to automatically correct the density through the use of the density meter 95 as a feedback device. In normal operation, the mix water as a percentage of slurry is calculated while the slurry level in Chamber B is held constant by adding more or less cement. In addition to this normal operation, the ACS also has the capability to monitor the actual density of the slurry by means of the density meter 95. According to the preferred embodiment, the operator must manually select this feature by activating Auto Density Switch 154 on the controller front panel, shown in FIG. 6.

If the automatic density correction feature is selected the controller determines if the actual density measured by the density meter 95 is above or below the target density. If the actual density is higher than the target density, the value of X (the percentage of mix water in the slurry, by volume) calculated above is automatically increased by a predetermined amount, which will result in the actual density being decreased as ratios of mix water and dry cement are changed.

Conversely, if the measured density is low, the calculated value of X is automatically decreased by a predetermined amount, thus causing the actual density to increase as the ratio of mix water and dry cement change. According to the preferred embodiment, the correction value is only increased or decreased each cycle by a small percentage. This is done to prevent overcompensation and wide fluctuations.

Figure 5:
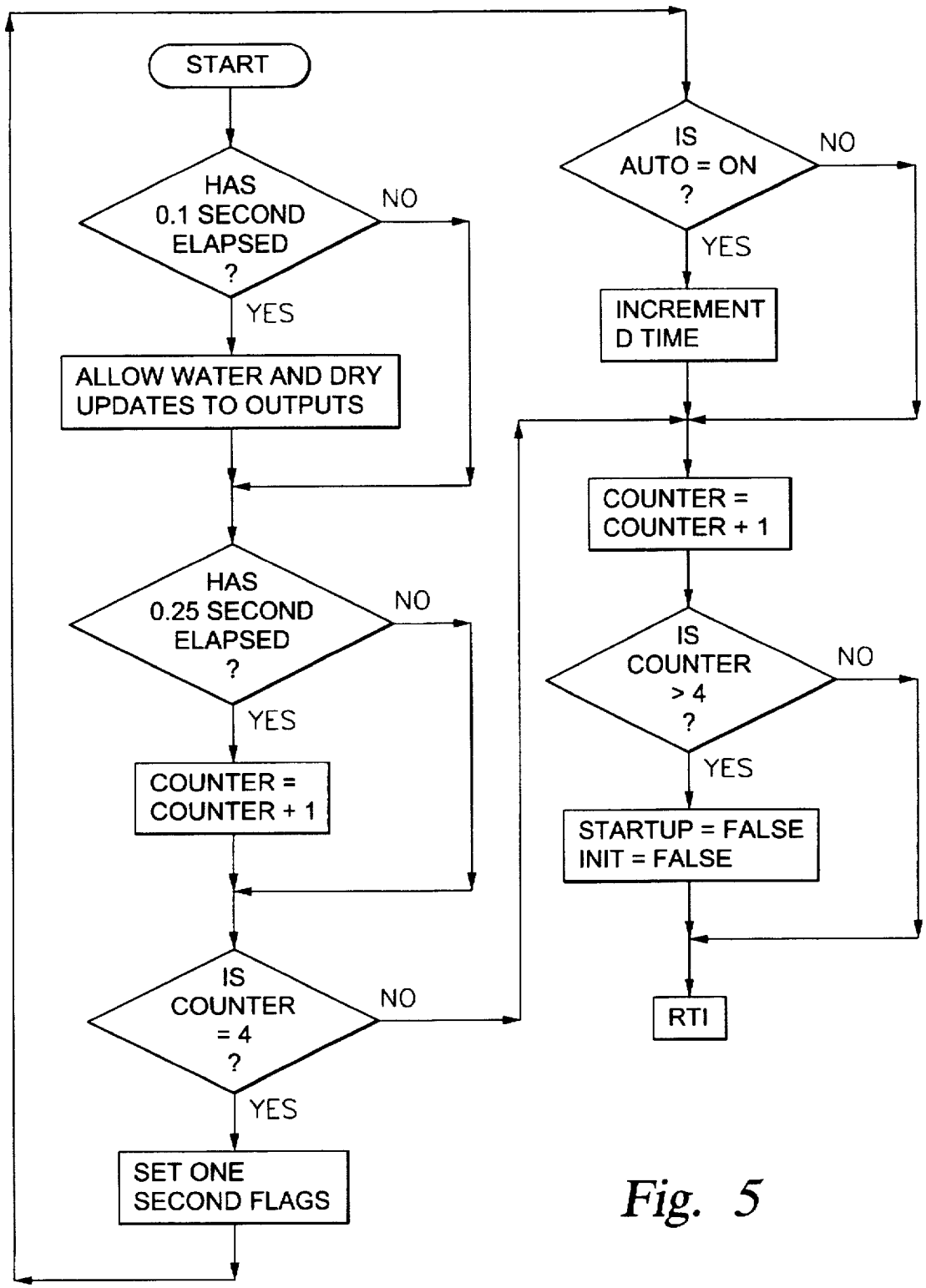
FIG. 5 is a flow chart showing how the internal controller timers are generated.

If the automatic density correction is not selected, or after it is complete, the controller in step 312 determines what the actual mix water flow rate is into the mixing chamber. To determine the mix water rate, the controller proceeds to the low level interrupt shown in FIG. 5 to gather the period for measurement and the amount of flow. FIG. 5 is a subroutine that measures pulses off of the input flow meter 37 and generates a period and a total. The controller, in step 312, uses the total number of pulses for the period and determines the amount of flow by referring to the k factor obtained during calibration and set-up for the mix water flow meter. Once the amount of flow and period are ascertained by the controller, the flow is divided by the period to obtain the mix water flow rate. This flow rate is then scaled from 0 to 10 volts, and sent as the feedback signal 125 to mix water servo-loop 120, shown in FIG. 2E-A.

In step 313, the system controller 100 determines the slurry discharge rate. The signal from the slurry flow meter 37 is in the form of a 0.004–0.020 amp current signal, similar to the output of the tub level sensor 65, where a 0.004 amp signal represents zero flow and a 0.020 amp signal represents maximum flow. The 0.004–0.020 amp current signal is converted to a corresponding 0–5 volt signal, which is then converted to a 10 bit digital signal. The digital signal is sampled by the system controller and scaled to its proper range. The slurry discharge rate, density, and tub level are all processed in this manner.

In step 301, the controller 100 determines the percentage of volume of cement slurry that should be mix water, to obtain the desired slurry density, and then calculates the proper mix water flow rate. According to the preferred embodiment, the controller determines the percentage of mix water (or fluid) by volume in the cement slurry.

In step 319, the system controller multiplies the percentage of mix water determined in step 301 by the slurry discharge rate determined in step 313 to determine the optimal rate at which the mix water (or other base fluid) should be supplied to the mixing chamber. In step 320, the result of this calculation is scaled from 0 to 10 volts and sent as the command signal 126 to op-amp 121 of the mix water servo-loop 120 (FIG. 2E-A), which generates control signal 127 to drive the mix water pump 35.

In step 322, the system controller 100 reads the weight of hopper 51 from weight sensor 44 and, in step 324, the weight is displayed on weight meter 152 on the panel 150 of system controller 100. This allows the operator to arrange for delivery of appropriate quantities of dry cement.

Step 326 checks the status of the "End of Run" switch located at the control panel of system controller 100. If the "End of Run" switch is activated the system controller returns to the Main Menu, otherwise the system controller returns to step 303 and begins a new cycle.

II. ACS Operation

The operation of the ACS system will now be described with reference to FIGS. 1 and 6. The operation of the ACS preferably comprises an initialization mode, a start-up mode, a run mode, a trim mode, and a rate variance mode.

A. Cementing Initialization

To initiate the ACS, the operator manually (1) sets the "Auto/Off/Manual" switch 151 (FIG. 6) to "Manual"; (2)

sets the "% water" thumbwheel switch 160 (FIG. 6) to it's approximate stage 1 value; (3) sets the "flowmeter/potentiometer" selector switch 158 (FIG. 6) to "potentiometer"; and (4) brings up the "rate" potentiometer 159 (FIG. 6) causing the water pump 35 (FIG. 1) to start filling the tub. Cement is then added by opening the cement slide-gate valve 45 (FIG. 1) through the use of the "cement" switch (FIG. 6, 161). Because the discharge valve 85 has yet to be opened, the slurry will be forced to recirculate through recirculation line 90. As the slurry flows through recirculation line 90, the density meter 95 measures the density of the slurry. Alternatively, the density can be measured manually by an operator.

Recirculation continues in this manner until two conditions occur: (1) the density measured is the same as the target or desired density, and (2) the level of cement in Chamber B of mixing Chamber 60 lies between the levels marked in FIG. 1 as $x_0$ and $x_1$. At any time prior to starting the run mode, the operator enters the following information into the system controller 100 for each operating stage: (a) the desired or target slurry density (PPG); (b) the density of the water or other base liquid being supplied through input line 30 (in PPG); and (c) the true and apparent densities of the dry cement being used (in PPG).

B. ACS Startup

After the ACS system has been initialized, the operator opens the discharge valve 85 to allow the cement slurry to be discharged through discharge line 80. At this time, the ACS controller 100 receives an output signal from the discharge flow meter 87 indicating that discharge flow has begun. The operator also manually sets the discharge pumps 89 located downstream in the slurry discharge line 80 to operating speed. When the discharge pumps 89 are brought up to operating speed, the level of slurry in Chamber B begins to fall.

Simultaneously, ACS controller 100 regulates the input water rate by adjusting the fresh water pump 35 to maintain a constant high precision ratio of input water rate to discharge cement rate. This is done by receiving a signal that represents the rate of flow of cement slurry through the discharge flow meter 87 and by determining the percentage of water by volume in the cement slurry. The controller 100 multiplies the discharge flow rate by the percent of water by volume to determine the amount and rate of water that is being discharged. Once this flow rate of water is that has been discharged. Once this flow rate of water is determined, the controller 100 adjusts the fresh water pump 35 to this rate. Thus, the controller 100 precisely controls the rate at which water is injected into the mixing chamber 60 so that it is the same as the amount of water that is discharged from the mixing chamber 60 (as part of the slurry). As a result, it is possible to obtain very precise control of the density of the slurry.

According to the preferred embodiment, the controller 100 determines the percentage of water (or other base fluid) by volume in the cement slurry using the following formula:

$$X = \frac{(\text{target } PPG) - (\text{cement true density } PPG)}{(\text{mix water density } PPG) - (\text{cement true density } PPG)} \times 100$$

Where X is the percentage of mix water (or base fluid) in the slurry, by volume. The "target PPG" is the desired slurry density. Similarly, the fraction of mix water (or base fluid) in the slurry, by volume is found from:

$$\text{volume fraction of mix water in slurry} = \frac{(\text{target } PPG) - (\text{cement true density } PPG)}{(\text{mix water density } PPG) - (\text{cement true density } PPG)}$$

After the controller 100 calculates the percentage of mix water (by volume) in the slurry, the controller 100 multiplies this number by the slurry discharge flow rate to determine the rate at which the input fluid should be supplied to the mixing chamber 60. The controller then sets the input pump at the proper speed to supply the input liquid at the requisite rate. The controller monitors the output from the input flow meter 37 to adjust the input pump 35 to the proper setting.

For example, if the discharge flow meter indicates that slurry is being discharged at 420 gallons/minute, and the controller determines from the operator inputs that the percentage of mix water (by volume) in the slurry is 48.1, the system controller 100 multiplies the percentage of mix water in the slurry by the slurry discharge flow rate, as follows: 48.1/100×420 gallons/minute=202 gallons/minute of input liquid. The controller 100 then sets the water pump 35 at a speed to inject 202 gallons/minute. The input flow meter 37 provides feedback to the controller 100 (and then to mix water servo-loop 120) of the actual rate of liquid being injected into the mixing chamber 60 to permit system controller 100 and servo-loop 120 to readjust the speed of the fresh water pump 35 via control signal 127 to precisely control the rate at which liquid is supplied to the mixing chamber 60.

If the discharge rate of the slurry increases, the flow rate at which mix water is added will tend to increase, to maintain the percentage of mix water in the slurry. The level in Chamber B of mixing chamber 60 will then tend to drop, causing tub level sensor 65 to unbalance op-amp 141 in the dry feed servo-loop 140 (FIG. 2E-B). As a result, control signal 147 will cause control valve 46 to drive the slide-gate valve 45 open, thus adding cement to mixing bowl 55 to maintain the tub level constant.

C. ACS Run Mode

Ideally, if the input flow meter 37 is extremely accurate permitting precise control of the fresh water pump 35, and if the discharge flow meter 87 is equally accurate, and if the valve 45 is delivering cement at the proper rate, so that the amount of dry cement and water being supplied to the mixing chamber 60 exactly equals the amount of cement and water being discharged as slurry, then the level of cement slurry in Chamber B will be fixed and stable, and the actual density of the discharged slurry will equal the desired slurry density input by the operator into the ACS controller 100. In other words, if all meters and valves are completely accurate, the level of slurry in Chamber B will be constant at this time.

D. PPG Trim

If a minor variation in the slurry density occurs it may be corrected manually using the mix water trim switch 155 (FIG. 6) referenced at step 305. Automatic density correction is available through the density loop of step 311. Steps 305 and 311 both add or subtract a predetermined value from the calculated percentage of mix water in the slurry.

After the actual and desired slurry density readings are equal, it is common to take and test a sample of the cement slurry being discharged. Alternatively, another density sensor may be provided downstream in the slurry discharge line. If the density of the sample discharge (or of the second density sensor) does not correspond to the density measured by density meter 95, then the operator can elect to use the ACS PPG Trim mode by pressing an appropriate switch on the control panel (not shown). Activation of this trim switch will be transmitted to the ACS system controller 100, which, in response will cause the ACS to operate in the trim mode. The trim switch permits the operator to manually alter the mix water/dry cement ratio in response to discrepancies between the target density and measured density.

In the trim mode, the controller 100 adjusts the ratio of input water rate to discharge cement slurry rate, which was based upon the percent of water by volume obtained from the calculations relating to the cement slurry discharge. By changing this ratio, the rate at which water is to be supplied to the mixing chamber 60 also will change, as will the rate at which dry cement is delivered to the mixing chamber 60. After the speed or position of input device 35 is set, then the speed of valve 45 is set to an approximate value based upon desired demand of dry cement. The controller 100 then monitors the output from the level sensor 65 and adjusts the desired dry demand rate until the slurry level in Chamber B remains constant.

E. Discharge Rate Variance

The controller 100 sets the input device 35 to the necessary setting so that the amount of water entering through input line 30 equals the amount of water leaving as slurry through the discharge line 80. The input flow meter 37 is used by the controller 100 as part of a closed loop feedback system to precisely set the rate of the device 35. After the mix water input rate is set, the controller then determines the approximate position of slide-gate valve 45 (or the approximate speed of the rotary valve, if one is used) that will provide the same amount of dry cement as is leaving as a component of the slurry. The controller 100 monitors the level sensor 65 and adjusts the dry cement rate as necessary to maintain the level of slurry in Chamber B constant.

Operation of the ACS system preferably continues until the total volume of slurry is discharged or until the operator indicates that it is time to begin a new stage. The controller 100 keeps track of total volume based upon the signals from the discharge flow meter 87. The controller 100 preferably obtains a signal from the discharge flow meter 87 once every 1/x of a second. Thus, the controller multiplies each rate signal from the discharge flow meter 87 by x to obtain a number that represents the total volume of slurry that has been discharged during that sampling period. The controller keeps a running count of the discharged volume by adding each new volume to the total accumulated volume, and compares the new total with the desired total.

While a preferred embodiment of the invention has been disclosed, various modifications can be made to the preferred embodiment without departing from the principles of the present invention.

```
                scnt3=0;
     }
     bktr();

/*include <int6811.h>
**************************************************************************

Automatic Cement Control System  2-8-93         B. Vicknair
Modified for Globe 5/94-7/94                    J. Craig
Added new Auto Density algorithm and finished menus, Dec 94, J. Craig
Stripped code and modified   8/95              A. Kitchen
Modified code Jan, 97                          C.S. Montgomery
**************************************************************************/
#include <stdarg.h>
#include <stdio.h>
#include <io6811.h>
#include <ctype.h>
#include <ioacs.h>
#include <acsio.h>
#include <string.h>
#include <protos.acs>  /*prototyping file*/
/*************************************************************************/
extern  int     Steady;
        int     tune=OFF;
        int     Slurry=OFF;
        int     ch;
        int     tub_adjust_lo = FALSE;
        int     tub_adjust_hi = FALSE;
        int     init_complete=FALSE;
        int     init = FALSE;
        int     init_cntr = 0;
        int     water_clock=FALSE;
        int     reference_clock=FALSE;
        int     dry_clock=FALSE;
        int     avgclock=FALSE;
        int     d_update=0;
        int     startup=TRUE;   /* powerup in startup mode */
        int     first_startup=FALSE; /* special flag for tub adjust */
        int     run=FALSE;
        float   hl;
        int     key_typ;
        int     tub_timer=FALSE;
        int     ESC=FALSE;
        int     MSG_INX=0;
        int     old_msg_type=LABELS+1;/* make a never*/
        int     p_ctr=0;         /* print to screen throttle*/
        int     update=30;/* update time on recorder on pwrup*/
        char    msg_counter2=0x30;/* for 1A -9Z counter*/
        char    msg_counter1=0x41;/* msd*/
        char    xtime_temp[16];
        int     MSG_TYP=0;
        int     CHART_STAT=FALSE;
        char    out_buf[MAXC_IN+1];
        char    in_buf[MAXC_IN+1];
        char    arry[10];
        char    t_string[10];
        int     buff_index=0;
        int     timerflg=0;/*input buffer handelers*/
        int     FAIL=FALSE;
        int     STAT;
        int     COMSFF;
        int     HOLD_FLG;
        int     STDIN,STDOUT;    /*point getc -putc to proper buffer*/
        int     scnt;
```

```
int         scntl=0;
int         btst;
int         seconds;
int         secflag;
int         density_check=FALSE;
int         flow_check=FALSE;
int         timex=FALSE;

int         key_flg;/*.25 sec key switch check flag*/
int         milclok; /*initialize clocks*/
int         milclok1; /* tenth second clock for run mode */
int         txsec,tsec;    /*below used in RTC routines */
int         txmin,tmin;
int         txhr,thr;
int         tpam;  /*am/pm*/
int         old_sec=0;
int         start_flg=0;
int         direction=UP; /* used with operator entry keys*/
int         cyc_ctr=0; /* recycle ctr to pass to log_scale() */
int         CH_B_STAT=FALSE; /* used to indicate if TX is in prog on 485b*/
int         ref_ctr=0; /* tub adjust counter */
unsigned long ic1raw=0;
unsigned long ic2raw=0;
unsigned long ic3raw=0;

unsigned long   ic1tot=0;
unsigned long   ic2tot=0;
unsigned long   ic3tot=0;

unsigned long   ic1_old=0;
unsigned int    ic2_old=0;
unsigned int    ic3_old=0;

int     ic1_ctr=0;
int     ic2_ctr=0;
int     ic3_ctr=0;

unsigned long   ic1temp=0;
unsigned long   ic2temp=0;
unsigned long   ic3temp=0;

int     time_out1=0;
int     time_out2=0;
int     time_out3=0;
/**/
char    text_arry[31];
/*****************************************************************/

/* below used by utils.c module */
unsigned int start,end,value,last;
unsigned char temp[16];
unsigned char cin,flag;
unsigned char *p;
/*****************************************************************/ float       ftemp=0;        /* used in keys*/
long        ltemp=0;
/*          RAMREF;*/
TEXT        _485_str[64];
TEXT        anlog_str[64];
TEXT        count_str[64];
TEXT        tmp_strng[64];
/******************** NVRAM Variables ****************************/
no_init     long        Mix_flowmeter;
no_init     long        Discharge_flowmeter;
no_init     long        Dry_feeder;
```

```
no_init     long        density_max;
no_init     long        density_min;
no_init     float       w_gain;
no_init     float       d_gain;
no_init     int         oc4_pwm_max;
no_init     int         oc4_pwm_min;
no_init     int         oc3_pwm_max;
no_init     int         oc3_pwm_min;
no_init     int         Stage_touched[9];

no_init     long        Wppg[10];      /* base fluid density ppg */
no_init     long        Cppg_t[10];    /* cement true density ppg */
no_init     long        Cppg_a[10];    /* cem. apparent dens. ppg */
no_init     long        Wsg[10];       /* %base fl. of slurry by vol */
no_init     long        ppg[10];       /* slurry target density ppg */
no_init     long        Csg[10];       /* %cem.(app) of slurry by vol */ no_init     int         steps;
no_init     long        k_facts[MAXCHANNELS];    /* rate & tot */
no_init     long        k_factsFS[MAXCHANNELS];  /* rate & tot chart*/
no_init     long        kMIN_analog[MAXCHANNELS];
no_init     long        kMAX_analog[MAXCHANNELS];
no_init     long        k_offset[MAXCHANNELS];
no_init     int         Stages;/* number of programmed stages */
no_init     int         stage_ctr; /*current running stage*/
no_init     int         Auto;
no_init     float       Dry_run_response;
no_init     float       Dry_start_response;
no_init     int         TubGain;
no_init     int         stab_time;
no_init     int         holdoff_time;
no_init     int         init_water_gain;
no_init     int         init_dry_gain;
no_init     long        stab_error_window;
no_init     long        auto_percent_correction;
/************************************************************/
long        tmp_long;               /*used for atol and others*/
float       data[MAXCHANNELS];      /* processed data during run time */
FILE        cfile[6];               /*make 6 comm files*/
#define     com1    cfile[0]        /*SCI in ,used for floppy storage*/
#define     com2    cfile[1]        /*SCI out. 9600 baud*/
#define     com3    cfile[2]        /* io485 in 9600 during test*/
#define     com4    cfile[3]        /* io485 out */
#define     com5    cfile[4]        /* LCD out.2400 baud*/
#define     com6    cfile[5]        /* LCD in (not used)*/

/*                  12345678901234567890123456789012345678901*/
#define     msg_1a  "~\x11%c%c    Stewart & Stevenson Services Inc.  "
#define     msg_1b  "~\x11%c%c              Petroleum Division       "
#define     msg_1c  "~\x11%c%cAutomatic Cement Control System (c) 1994"
#define     msg_1d  "~\x11%c%c           Serial# proto               "

/********************** MAIN ********************************/
void main(void)
{
    init_io();      /* via & dac init */
    set_sens();     /* input capture sensitivity */
    buffint();      /*initialize comm buffers and flags*/
    enable_interrupt();
    while (seconds <= 2)    /*bootup delay*/
        {;}
    init_msg(); /*  just a simple logon message*/
    while (seconds <= 7)    /* delay for lcd */
        {;}
    RTC_EN= 0x40;/* make sure clock is running*/
```

```
        while(TRUE==TRUE)        /*always loop here*/
            {
            select_screen();
            }
        }
/**********************************************************************/ void buffint(void)
    {
    com1._fd = 1;       /*initialize file descriptors*/
    com2._fd = 2;
    com3._fd = 3;
    com4._fd = 4;
    com5._fd = 5;
    com6._fd = 6;

com1.status = NULL;     /*initialize status*/
    com2.status = NULL;
    com3.status = NULL;
    com4.status = NULL;
    com5.status = NULL;
    com6.status = NULL;

com2.flag = NULL;
    com4.flag = NULL;
    com5.flag = NULL;

com1.flag = EOF;        /*initialize flag*/
    com3.flag = EOF;
    com6.flag = EOF;        /* lcd in */ com1.nextc = com1.base = &com1.cbuff[0];    /*SCI in*/
    com2.nextc = com2.base = &com2.cbuff[0];    /*SCI out*/
    com3.nextc = com3.base = &com3.cbuff[0];    /* ANL in*/
    com4.nextc = com4.base = &com4.cbuff[0];    /* ANL out*/
    com5.nextc = com5.base = &com5.cbuff[0];    /* LCD out*/
    com6.nextc = com6.base = &com6.cbuff[0];    /* LCD in */
    }

/**********************************************************************/
void    flushb(int tp1)         /*flush com buffer*/
    {
    int     outstd = STDOUT;
    int     instd = STDIN;

switch(tp1){
        case 1:                         /*SCI IN */
            disable_interrupt();
            com1.flag = EOF;
            com1.status = NULL;
            com1.nextc = com1.base = &com1.cbuff[0];
            enable_interrupt();
            break;
        case 2:                         /*SCI OUT*/
            disable_interrupt();
            com2.flag = NULL;
            com2.status = NULL;
            com2.nextc = com2.base = &com2.cbuff[0];
            enable_interrupt();
            break;
        case 3:                         /* RS485 ANA IN*/
            disable_interrupt();
            com3.flag = EOF;
            com3.status = NULL;
```

```
                com3.nextc = com3.base = &com3.cbuff[0];
                enable_interrupt();
                break;
        case 4:                         /* RS485 ANA OUT*/
                disable_interrupt();
                com4.flag = NULL;
                com4.status = NULL;
                com4.nextc = com4.base = &com4.cbuff[0];
                enable_interrupt();
                break;
        case 5:                         /* LCD OUT*/
                disable_interrupt();
                com5.flag = NULL;
                com5.status = NULL;
                com5.nextc = com5.base = &com5.cbuff[0];
                enable_interrupt();
                break;
        default:                        /* LCD IN*/
                disable_interrupt();
                com6.flag = NULL;
                com6.status = NULL;
                com6.nextc = com6.base = &com6.cbuff[0];
                enable_interrupt();
                break;
        }
        STDOUT = outstd;
        STDIN = instd;
}

/***************************************************************************/
void    bufout(void) /* called from timer int */
        { if (com2.status == _WFLAG) {            /*SCI transmit*/
                if ((SCSR & TXRDY1) == TXRDY1)
                SCDR = *com2.nextc++; /*output char & point to next char*/
                if (com2.nextc >= (com2.cbuff+BUFSIZ))/*TEST-point past buff?*/
                    com2.nextc = &com2.cbuff[0]; /* repoint to begin of buffer*/
        }
        if (com2.nextc == com2.base) {          /* -buffer empty*/
                com2.flag = NULL;               /*make flag NULL*/
                com2.status = NULL;             /*if yes - reset status*/
        } if (com4.status == _WFLAG) {            /*RS485 transmit*/
                if ((ANAST & TXRDY_A) == TXRDY_A)/*tx buff empty?*/
                {
                /*turn off the rx and on the transmitter*/
                PORTGC= 0x04; /* rx off */
                PORTGC= 0x01; /*set bit 0, cha enbs*/
                ANARW = *com4.nextc++;/*output char & point to nextc*/
                }
                if (com4.nextc >= (com4.cbuff+BUFSIZ))/*TEST-point past buff?*/
                    com4.nextc = &com4.cbuff[0];/* repoint to begin of buffer*/
        }
        if (com4.nextc == com4.base) {          /* -buffer empty*/
                com4.flag = NULL;       /*make flag NULL*/
                com4.status = NULL;     /*if yes - reset status*/
        } if (com5.status == _WFLAG)
```

```c
                /* LCD  RS  :5 transmit*/
    if (((DIST & TXRDY_B) == TXRDY_B) && COM5FF >=2 )/* tx shft reg empty*/
                {
        /*      DB_CRB=WAKE; turn on tx,turn off rx first*/
                PORTGC= 0x08; /* turn off rx */
                PORTGC= 0x02; /*set bit 1, chb lcd 485 en,rx disable*/
                DISRW = *com5.nextc++;  /*output char & pt to nextc*/
                COM5FF=0;                       /*RESET FLIP FLOP*/
        /*      DB_CRB=SLEEP;    auto turn off*/
                }
                if (com5.nextc >= (com5.cbuff+BUFSIZ))/*TEST-point past buff?*/
                 com5.nextc = &com5.cbuff[0]; /*  repoint to begin of buffer*/
                }
                /*if (COM5FF >=9 )
                        COM5FF=0;*/
                COM5FF++;
        if (com5.nextc == com5.base) {          /* -buffer empty*/
                com5.flag = NULL;               /*make flag NULL*/
                com5.status = NULL;             /*if yes - reset status*/
                }
        }
    if ((DIST & TXRDY_B) == TXRDY_B)/* tx shft reg empty*/
                {
                PORTGS=0x02;/* then turn off the tx ,rx on seperate,no glitch*/
                PORTGS=0x08;
                }
    if ((ANAST & TXRDY_A) == TXRDY_A)/*tx buff empty?*/
                {
                PORTGS=0x01; /* turn off io485 line*/
                PORTGS=0x04; /* turn on rx */
                }
    /*      if(testff==0){PORTGS=0x10;testff=1;}      test
            else {PORTGC=0x10; testff=0;}*/
    }
/********************* VECTOR ROUTINES ********************************/
/*
This routine is called on interrupt -IRQ.
It put the received char in the buffer and sets the pointers
*/
void vecirq(void)
        {
/*first check int flg and see if it is tx complete signal*/
        TEXT            c;
        c = ANAST;                              /*clear int flag*/
        c = ANARW;
        if (c == '\r')          /*read data from duart port*/
                *com3.base++ = '\0';    /*end of string delim*/
        else
                *com3.base++ = c;       /*store char*/
        if (com3.base >= (com3.cbuff + BUFSIZ))
                com3.base = &com3.cbuff[0];
        if (com3.base == com3.nextc)
                ;
                com3.flag = _RFLAG;     /*set flag to show data has been read*/
        }
/***********************************************************************/
/*
This routine is called on interrupt -SCI.
It put the received char in the buffer and sets the pointers
*/
void vecsci(void)
        {
        TEXT            c;
        c = SCSR;
        c = SCDR;               /*read data from SCI port*/
        if (c == '\r')
```

```c
                *com1.base++ = '\0';    /*end of string delim*/
            else
                *com1.base++ = c;                       /*store char*/
        if (com1.base >= (com1.cbuff +BUFSIZ))
                com1.base = com1.cbuff;
        if (com1.base == com1.nextc)
            ;
        com1.flag = _RFLAG;     /*set flag to show data has been read*/
        }
/*********************************************************************/
void    nullfunc(void)
        {
        ;
        }
/*********************************************************************/
void    vectoc2(void)
#define timsk1  0x40                    /*timer interrupt flag reset value */
#define coprst  (*(char *)0x703A)               /*COP time out register*/
#define led     (*(char *)0x7ffe)
#define COPA    0x55
#define COPB    0xAA
        {
        TFLG1 = timsk1;                         /*resets enable*/
        TOC2  = (CINTIME + TCNT);               /* resets timer */
        if(++milclok1 )= TENTH_SEC)  /* tenth second loop for run loop */
                {
                water_clock=TRUE;
                dry_clock=TRUE;
                milclok1=0;
                avgclock=TRUE;
                }
        if(++milclok )= QUARTER_SEC)    /* quarter second loop */
                {       /*incs SYS clock  & chks if .X sec*/
                milclok = 0;
                key_flg = TRUE;
                if(++scnt )=4)     /* one second flags */
                        {
                        timex=TRUE; /* screen time update */
                        secflag = TRUE;
                        scnt = 0;
                        if(++seconds )= 60)
                                seconds =0;
                        }
                }
        bufout();       /*output a buffer char at least every .004 sec*/
        coprst = COPA;          /*write to COP*/
        coprst = COPB;          /*write to COP*/
        }
/*********************************************************************/
int     atoi(const TEXT *nptr)
        {
        register        int     num;
        unsigned        char    sig;

while(isspace(*nptr))
                ++nptr;
        sig = (*nptr == '+' || *nptr == '-') ? (*nptr++ == '-') : NO;
        for(num = 0; isdigit(*nptr);++nptr)
                num = num * 10 + (*nptr - '0');
        return((sig) ? -num : num);
        }
/*********************************************************************/
int     putc(TEXT x,int stdout) /*get char from data stream.
                                  x=char to be outputed
```

```
                stdout=buffer to be operated on */
        {
FILE    *fp;

fp = cfile +stdout;     /*get correct file to work on &
                                  see if buff is full*/
        while(fp->flag ==EOF)
                ;
        *fp->base++ = x;   /*get char and put into buffer increment base
                             pointer*/
        fp->status = _WFLAG;    /*set buf written flag*/
        if (fp->base >= (fp->cbuff+BUFSIZ))  /*TEST-point past buff?*/
                fp->base = fp->cbuff;    /*repoint to begin of buffer*/
        if (fp->base == fp->nextc)      /*TEST -buffer full?*/
                fp->flag = EOF;         /*make flag EOF*/
        return(NULL);
}
/*********************************************************************/
int     getc(int p)     /*get char from data stream,
                          p=usually what ever STDIN is*/
        {
        FILE    *fp;
        TEXT    c;      /*character returned by function*/ fp = cfile +p;                  /*get correct file to work on &
                          check to see if buffer has been written to.*/
        if (fp->flag ==_RFLAG) {
                c = *fp->nextc++;     /*put char from buff
                into c & inc nextc pointer*/
                if (fp->nextc >= (fp->cbuff + BUFSIZ))       /*TEST-point
                                                              past buff?*/
                        fp->nextc = fp->cbuff;  /*repoint to begin of buffer*/
                if (fp->base == fp->nextc) /*TEST -buffer empty?*/
                        fp->flag = EOF;    /*make flag EOF*/
                        return(c);
        } else
                return(EOF);            /*return an eof char if empty*/
}
/*********************************************************************/
int getchar(void)
        {
        return(getc(STDIN));
        }
/*********************************************************************/
int putchar(char c)
        {
        return(putc(c,STDOUT));
}
/*********************************************************************/
void    init_msg(void)
        {
        STDOUT = comm5; /* lcd  */
        printf(CLRSCRN);
        printf(CUROFF);
        printf(msg_1a,1,1);
        printf(msg_1b,2,1);
        printf(msg_1c,3,1);
        printf(msg_1d,4,1);
        }
/*********************************************************************/
/*********************************************************************/
/* read time */
 time( )
        {
        int     stdout,stdin;
```

```
                stdin=STDIN; /* save calling status*/
                stdout=STDOUT;
                STDOUT = comm5; /* lcd*/
                CTL = STOP;     /* stop(freeze) time,background still runs*/
                tsec =SEC;
                tmin = MIN;
                thr = (HOUR & HR_MASK);
        /* now see if to proceed */
                if(tsec == old_sec )
                        { CTL = RUN;
                          STDOUT=stdout;
                          STDIN=stdin;
                          return;
                        }
                CTL = RUN;      /*let it run */
                old_sec = tsec; /* update for next*/
                txsec=tsec=bcdbin(tsec); /*convert bcd to bin"int"*/
                txmin=tmin=bcdbin(tmin);
                txhr=thr=bcdbin(thr);/* t"x" functins for recorder print*/
                tpam = (PAM & TODR); /*read and mask am/pm*/

/* now print to display */
        /*              12345678901234567890123456789012345678901234567890*/
        /*                                                  00:00:00 AM*/
                printf("~\x11%c%c:",4,32);
                printf("~\x11%c%c:",4,35);      /* print colons*/
                if(((char)tpam)==0)
                        printf("~\x11%c%c AM",4,38);
        /* then must be PM*/
                else
                        printf("~\x11%c%c PM",4,38);
        /*      */
        /* now output hour with pad if necessary */
                if(thr <10)     {
                        printf("~\x11%c%c0",4,30);
                        printf("~\x11%c%c%1d",4,31,((char)thr));
                        }
                else
                        printf("~\x11%c%c%2d",4,30,thr);

/* now output min with pad if necessary */
                if(tmin <10)    {
                        printf("~\x11%c%c0",4,33);
                        printf("~\x11%c%c%1d",4,34,((char)tmin));
                        }
                else
                        printf("~\x11%c%c%2d",4,33,tmin);
        /* now output sec with pad if necessary */
                if(tsec <10)    {
                        printf("~\x11%c%c0",4,36);
                        printf("~\x11%c%c%1d",4,37,((char)tsec));
                        }
                else
                        printf("~\x11%c%c%2d",4,36,tsec);
        update++;/* chart recorder */ if(update>=UPDATE)
                {/*     print_time();*/
                        update=0;}

STDOUT=stdout;
        STDIN=stdin;
                }
        /*********************************************************************/ set_time() /* test*/
```

```
{
int     STDOUT =comm5; /* lcd */
int     cursor_x=31;
int     cursor_y=3;
int     fcount=31;
int     key_typ;
int     acp_flg = FALSE;
int     exit=FALSE;
int     tmask,temp;
        printf(CLRSCRN);

/* increment changes cursor location,dec changes time par*/
                printf(""\x11%c%cv",3,((char)fcount)); /*inital set up*/
/*              1234567890123456789012345678901234567890*/
/*                                00:00:00 AM*/
printf(""\x11%c%c---------------Set Time----------------",1,1);
                printf(""\x11%c%cUse INC to move cursor",2,4);
                printf(""\x11%c%cUse DEC to change time",3,4);
                printf(""\x11%c%cAccept to Exit",4,4);
            while (acp_flg == FALSE)
            {
                time();
                     key_typ = key_chk();
                                if( key_typ == 4 ){      /* increment */
                                {
                     printf(""\x11%c%c ",3,((char)fcount));/*clear previous*/
                                                fcount=fcount+3;
                                                if( fcount >= 41 )
                                                        fcount = 31;
                                                }
                            printf(""\x11%c%cv",3,((char)fcount)); /*write new*/
                                        fwd_clr();
                                                }

/*test*/
                                        if(key_typ == 3)
                                        {
        time(); /*update regs*/
        CTL =STOP; /*stop the regs*/

/* decrement actually changes the time*/
                if(fcount==31) /*then do hour*/
                        {
/*      tpam = (PAM & TODR); read and mask am/pm*/
        tmask=(HOUR & 0x0060); /* mask out ampm and ampm flg*/
        temp = (HOUR & HR_MASK);/* now just get hour*/
        temp= bcdbin(temp);
        temp--;
                        if(temp> 12) /* really an error cond including ff rollover*/
                                temp=12; /*correct for overflow*/
                        if(temp <1)
                                temp=12;
                        temp= binbcd(temp);
        HOUR = (  ((char)temp)  |  ((char)tmask)  );/* reconstruct */
        HOUR = (HOUR | 0x40); /* make sure in 12 hour format*/
        old_sec=-1;/* force update*/
        CTL=RUN;
        hlf_key();
                                        time();
                                        } if(fcount==34) /*then do min*/
                        {
        temp = MIN; /* in bcd*/
        CTL=RUN;
```

```
           temp= bcdbin(temp);

temp = (temp-1);
                   if(temp>59)
                           temp=0; /*correct for overflow*/
                   if(temp<0)
                           temp=59;
           temp=binbcd(temp);

MIN = ((char)temp);
           old_sec=-1;/* force update*/
           hlf_key(); /* test */
                                   time();
                                   }
                   if(fcount==37) /*then do second*/
                                   {
           temp = SEC; /* in bcd*/
           CTL=RUN;
           temp= bcdbin(temp);
           temp = (temp-1);
                   if(temp>59)
                           temp=0; /*correct for overflow*/
                   if(temp<0)
                           temp=59;
           temp=binbcd(temp);
           SEC = ((char)temp);
           old_sec=-1;/* force update*/
           qtr_key(); /* test */
                                   time();
                                   } if(fcount==40) /*then ampm toggle*/
                                   {
           tmask=0;
           temp= (HOUR & 0xdf); /* pre clear ampm*/
           tmask = (PAM & TODR); /*read and mask am/pm*/
                   if(tmask==0)/* was in am*/
                           tmask=0x20;
                   else
                           tmask=0;
           HOUR = ( ((char)temp) | ((char)tmask) );/* reconstruct */
           HOUR = (HOUR | 0x40); /* make sure in 12 hour format*/
           old_sec=-1;/* force update*/
           CTL=RUN;
           rev_clr();
                                   time();
                                   }
           }
                   /* now check accept */
                                   if(key_typ == 1){
                                   time();
                                   acp_flg = TRUE;
                                   acp_clr();
                                           }
                                   }
                   return;
           }
/***********************************************************/
int     bcdbin(passed)  /* convert the passed int(BCD) to hex_bin*/
        {               /* no error check and #must be >99 */
        int     num_tmp = 0;
unsigned char op = 0;
        int *point;
```

```
point = &passed;
    op = ((*point) & 0x0f);/* mask lo nyb*/
    num_tmp = op;            /* save lo nibble*/
    op = ((*point) & 0xf0);/* mask hi nyb*/
    op= (op/16); /* shift right 4 places*/
    op= (op*10); /*adjust*/
    op= (op & 0x00ff); /* make sure*/
    return(passed=(num_tmp+op));
    }
/*****************************************************************/
```

```
void get_ideclong(float);
void min_max(void);

/*include <int6811.h>
*******************************************************************
acs1.c
select cal ,job entry and misc get_text( )            get an index from nvram
sto_text( )            put an index in nvram
User menus edited for final version, Dec 94, JHC
Added Tune mode and Auto menus, Dec 94, JHC
Modified Jan, 97        C.S. Montgomery
*******************************************************************/
#include <stdarg.h>
#include <stdio.h>
#include <io6811.h>
#include <ctype.h>
#include <ioacs.h>
#include <acsio.h>
#include <string.h>
#include <protos.acs>  /*prototyping file*/
/*******************************************************************/
int             escapex=FALSE;
extern   int      tune;
extern   int      TubGain;
extern   int      Auto;
extern   long     density_max;
extern   long     density_min;
extern   long     stab_error_window;
extern   long     auto_percent_correction;
extern   int      stab_time;
extern   int      holdoff_time;
extern   int      init_water_gain;
extern   int      init_dry_gain;
extern   float    w_gain;
extern   float    d_gain;
extern   long     Mix_flowmeter;
extern   long     Discharge_flowmeter;
extern   long     Dry_feeder;
extern   float    Dry_run_response;
extern   float    Dry_start_response;
extern   int      key_typ;
extern   int      oc4_pwm_max;
extern   int      oc4_pwm_min;
extern   int      oc3_pwm_max;
extern   int      oc3_pwm_min;
extern   float    ftemp;
extern   int      ch;
extern   long     ltemp;
extern   int      cyc_ctr;
extern   int      FAIL;
extern   int      direction;
extern   unsigned char temp[16];
extern   char     out_buf[MAXC_IN+1];
extern   STDIN,STDOUT;   /*point getc -putc to proper buffer*/
extern   int      timex;
extern   long     kMIN_analog[MAXCHANNELS];
extern   long     kMAX_analog[MAXCHANNELS];
extern   long     k_offset[MAXCHANNELS];
```

```
extern      long            tmp_long;       /*used for atol and others*/
extern      FILE            cfile[6];       /*make 6 comm files*/
int                         Default=OFF;    /* check for loading defaults*/
/*extern                char            CH_TEXT;*/
#define     com1    cfile[0]        /*SCI in ,used for floppy storage*/
#define     com2    cfile[1]        /*SCI out, 9600 baud*/
#define     com3    cfile[2]        /* io485 in 9600 during test*/
#define     com4    cfile[3]        /* io485 out */
#define     com5    cfile[4]        /* LCD out,2400 baud*/
#define     com6    cfile[5]        /* LCD in (not used)*/
/*********************************************************************/
        select_screen()/*select RUN,Clear Totals,or CALIBRATION/SELF-TEST*/
{
int     STDOUT =comm5;  /* lcd */
int     cursor_x=10;
int     cursor_y=2;
int     fcount=2;
int     key_typ;
int     acp_flg = FALSE;
/*    */
    printf(CLRSCRN);
    printf("~\x11%c%c----------Automatic Cementer----------",1,1);
    printf("~\x11%c%cJob Data Entry",2,12);
    printf("~\x11%c%cRun ACS",3,12);
    printf("~\x11%c%cCalibration/Setup",4,12);
    printf("~\x11%c%c",((char)cursor_y),((char)cursor_x));
    while (acp_flg == FALSE)
    {
        if(timex==TRUE)
        {
            time();
            timex=FALSE;
        }/*keep time on screen*/
        key_typ = key_chk();
        if(key_typ == 4)
        {       /* increment */
            printf("~\x11%c%c ",((char)fcount),10);/*clear previous*/
            fcount=fcount+1;
            if( fcount >= 5)
                fcount = 2;
            printf("~\x11%c%c>",((char)fcount),10); /*write new*/
            fwd_clr();
        } if(key_typ == 3)
        {       /* decrement */
            printf("~\x11%c%c ",((char)fcount),10);/*clear previous*/
            fcount--;
            if( fcount < 2)
                fcount = 4;
            printf("~\x11%c%c>",((char)fcount),10); /*write new*/
            rev_clr();
        } if(key_typ == 1)
        {       /* now check accept */
            acp_flg = TRUE;
            acp_clr();
        }
    }
    switch (fcount){
                case 2:
                    job_data();
                    break;
                case 3:
```

```c
                                        run_acs();
                                        break;
                        case 4:
                                setup();
                                break;
                        default:
                                job_data();
                                break;
                }
}
/****************************************************************/ setup() /*select    "Zero Density Meter"
                    "Install/Modify K Factors & Time"
                    "Set Time"
         */

{
        int     STDOUT =comm5; /* lcd */
        int     cursor_x=6; /* inital cursor positions*/
        int     cursor_y=2;
        int     fcount=2;
        int     key_typ;
        int     acp_flg = FALSE;
        escapex=FALSE;

printf(CLRSCRN);
        /*              12345678901234567890123456789012345678890*/
        printf("~\x11%c%c          Select Function          ",1,1);
        printf("~\x11%c%cSet K factors",2,8);
        printf("~\x11%c%cSet Current loops",3,8);
        printf("~\x11%c%cSet Time",4,8);

printf("~\x11%c%c)",((char)cursor_y),((char)cursor_x));

while (acp_flg == FALSE)
        {
                if(timex==TRUE)
                {
                        time();
                        timex=FALSE;
                }/*keep time on screen*/ key_typ = key_chk();
                if(key_typ == 4)
                {       /* increment */
                        printf("~\x11%c%c ",((char)fcount),6);/*clear previous*/
                        fcount=fcount+1;
                        if( fcount >= 5)
                                fcount = 2;
                        printf("~\x11%c%c)",((char)fcount),6); /*write new*/
                        fwd_clr();
                }
                if(key_typ == 3)
                {       /* decrement */
                        printf("~\x11%c%c ",((char)fcount),6);/*clear previous*/
                        fcount--;
                        if( fcount < 2)
                                fcount = 4;
                        printf("~\x11%c%c)",((char)fcount),6); /*write new*/
                        rev_clr();
                }
                if(key_typ == 1)
                {       /* now check accept */
```

```
                    acp_flg = TRUE;
                    acp_clr();
                    }
            if(key_typ==2) return;
            } switch (fcount){
                                    case 2:
                                            k_factors();
                                            break;
                                    case 3:
                                            zero_density();
                                            break;
                                    case 4:
                                            set_time();
                                            break;
                                    default:
                                            zero_density();
                                            break;
                                    }
    }

/*******************************************************************/
/* zero_density meter calls 4-20 loop read and scales, displays, asks to chg*/ zero_density()
        {
        for(ch=0;ch<3;ch++)     /* bypass Cement Wt. */
                {
                esc_clr();
                escapex=FALSE;
                min_max();
                if(escapex!=TRUE)
                        offset();
                }
        }
/*******************************************************************/
/* "offset" adds or subtracts up to 3k relative points from a binary array
 used during run time for offset , this routine will be called during
 run time and will display calculated real units . It is also called
 in the set up screen displaying only the offset */

/* ftemp global is used for printf only. */
offset()
{
                                /* first display old value*/
int     acp_flg=FALSE;
int     key_typ,temp;

cyc_ctr=0;
        printf(CLRSCRN);
                /*xxxxxxx1.xxx */
        if(k_offset[ch]>MAX_OFFSET)
                {
                k_offset[ch]=MAX_OFFSET; /*set to MAX*/
                }
        if(k_offset[ch]<0)
                {
                k_offset[ch]=0; /*set to min*/
                }
        ltemp=k_offset[ch];/* load temp reg*/
/*              1234567890123456789012345678901234567890*/
        printf("~\x11%c%c INC/DEC to change offset,ESC to exit %1d",1,1,ch);
        acp_flg=FALSE; /* preset*/
        z_func(ch); /* display current value */
```

```
          while(acp_flg==FALSE)
                {
                if(timex==TRUE)
                        {
                        time();
                        timex=FALSE;/*keep time on screen*/
/*              temp=do_a_d(DENSITY_CH);                              */
/*              printf("~\x11%c%cInt A/D=  %4d       ",3,10,temp);*/
                        }
                key_typ=key_chk();
                if(key_typ == 1) /* then normal exit*/
                                {
                                acp_flg=TRUE;
                                acp_clr();
                                }
                if(key_typ == 2) /* then hard exit screen*/
                                {
                                esc_clr();
                                return;
                                }
                if(key_typ == 4) /*inc k fac*/
                                {
                                direction=UP; /*increment*/
                                log_scale();/* scale the long and update ftemp*/
                                if(ltemp>MAX_OFFSET)
                                        ltemp=MAX_OFFSET; /*set to MAX*/
                                if(ltemp<0)
                                        ltemp=0; /*set to min*/
                                k_offset[ch]=ltemp;
                                printf("~\x11%c%cNew OS %4ld    ",4,1,ltemp);
                                cyc_ctr++;
                                qtr_key();
                                z_func(ch); /* get a/d data and scale, redisplay */
                                }
                /*check dec*/
                if(key_typ == 3) /*dec k factor */
                                {
                                direction=DOWN;
                                log_scale();/* flt,int*/
                                if(ltemp>MAX_OFFSET)
                                        ltemp=MAX_OFFSET; /*set to MAX*/
                                if(ltemp<0)
                                        ltemp=0; /*set to min*/
                                k_offset[ch]=ltemp;
                                printf("~\x11%c%cNew OS %4ld    ",4,1,ltemp);
                                cyc_ctr++;
                                qtr_key();
                                z_func(ch);/* see if offset to be displayed*/
                                }
                if(key_typ==FALSE)
                                cyc_ctr=0;/* after key is released clear ctr*/
                }
/* at this point the new k has been selected and will be stored if ok*/
        k_offset[ch]=ltemp;
}

/*******************************************************************/
void min_max(void)
{
long oldmin;

printf(CLRSCRN);
        switch (ch)
                {
```

```
         case 0:
                 printf("~\x11%c%cTub Level",2,4);
                 break;
         case 1:
                 printf("~\x11%c%cDensity ",2,4);
                 break;
         case 2:
                 printf("~\x11%c%cDischarge Rate",2,4);
                 break;
         case 3:             /* case 3 bypassed */
         default:
                 printf("~\x11%c%cCement 1000 pounds",2,4);
                 break;
         }
/* now find the MIN Scale */
         ltemp = oldmin = kMIN_analog[ch]; /* load temp reg*/
         ftemp=(float)ltemp;
         ftemp=ftemp/1000; /* convert to 3 dp format*/
/*               12345678901234567890123456789012345678890*/
         printf("~\x11%c%c   Min Scale @4ma.    ",1,1);
         printf("~\x11%c%cOld    factor %2.2f   ",3,15,ftemp);
         get_ideclong(50.0); /* upper inc limit */
         if(escapex==TRUE)
                 return;
         kMIN_analog[ch]=ltemp;

/* now find the FULL Scale */
         ltemp= kMAX_analog[ch];/* load temp reg*/
         ftemp=(float)ltemp;
         ftemp=ftemp/1000; /* convert to 3 dp format*/
/*               12345678901234567890123456789012345678890*/
         printf("~\x11%c%c   Full Scale @20ma.    ",1,1);
         printf("~\x11%c%cOld    factor %2.2f   ",3,15,ftemp);
         get_ideclong(100.0); /* upper inc limit */
         if(escapex==TRUE)
         {
                 kMIN_analog[ch]=oldmin; /* restore previous entry */
                 return;
         }
         kMAX_analog[ch]=ltemp;

}
/***********************************************************/ c_func(ch_m)
{
int     stdout,stdin;
long    konstant;
int     func,temp;
int     voltage;
int     current;
long    wk1;
float   wk2;
float   k_span,mul,min; /* for zero and span*/
stdout=STDOUT;
stdin=STDIN;
STDOUT=ccmm5; /* lcd*/ k_span=(float)kMAX_analog[ch_m]-(float)kMIN_analog[ch_m];
         mul=k_span/((ADBIT-(float)k_offset[ch_m]));/*auto scale*/
         min=(float)kMIN_analog[ch_m]/1000;/*get scale offset adder  */
         current=(do_a_d(ch_m)) - k_offset[ch_m];
         if(current<0)
```

```
            current=0;
        wk2=(((float)current*mul)/1000) + min;/* scale and add display offset*/
        printf("~\x11%c%c Current reading = %3.3f  ",3,5,wk2);

STDOUT=stdout;
        STDIN=stdin;
}

/*****************************************************************************/ k_factors( )
{
        int     STDOUT =comm5; /* lcd */
        int     cursor_x=6; /* inital cursor positions*/
        int     cursor_y=2;
        int     fcount=1;
        int     key_typ;
        int     acp_flg = FALSE;

escapex=FALSE;
/*    */
printf(CLRSCRN);
ltemp=Mix_flowmeter;/* load temp reg*/
ftemp=(float)Mix_flowmeter;
ftemp=ftemp/1000; /* convert to 3 dp format*/
/*           1234567890123456789012345678901234567890*/
printf("~\x11%c%c    Enter Mix Water pulses/ft^3      ",1,1);
printf("~\x11%c%cOld k factor %5.2f   ",3,15,ftemp);
get_ideclong(40000.0);
Mix_flowmeter=ltemp;

/* printf(CLRSCRN);
ltemp=Dry_feeder;   load temp reg
ftemp=(float)Dry_feeder;
ftemp=ftemp/1000;   convert to 3 dp format
           1234567890123456789012345678901234567890
printf("~\x11%c%c    Enter Dry Feeder pulses/Rev      ",1,1);
printf("~\x11%c%cOld k factor %5.2f   ",3,15,ftemp);
get_ideclong(40000.0);
Dry_feeder=ltemp;   */

Dry_feeder=1000;  /* dummy read */
}

/*****************************************************************************/

/* hl is high limit*/
void get_ideclong(float hl)/* used by any long that needs to be entered, printa at 4,15*/
{
int acp_flg=FALSE; /* preset*/
gtr_key();
while(acp_flg==FALSE)
        {
        if(timex==TRUE)
                {
                time();
                timex=FALSE;
                }
        key_typ=key_chk();
        if(key_typ == 1) /* then normal exit*/
                        {
                        acp_flg=TRUE;
                        acp_clr();
```

```
        if(key_typ == 2) /* then hard exit screen*/
                        {
                        esc_clr();
                        escapex=TRUE;
                        return;
                        }
        if(key_typ == 4) /*inc k fac*/
                        {
                        direction=UP; /*increment*/
                        log_scale();/* scale the long and update ftemp*/
                        if( ftemp>hl)
                                {
                                ftemp=hl;
                                ltemp=(long)(ftemp*1000); /* clamp out */
                                }
                        printf("~\x11%c%c%5.3f   ",4,15,ftemp);
                        cyc_ctr++;
                        qtr_key();
                        }
                /*check dec*/
        if(key_typ == 3) /*dec k factor */
                        {
                        direction=DOWN;
                        log_scale();/* flt,int*/
                        printf("~\x11%c%c%5.3f   ",4,15,ftemp);
                        cyc_ctr++;
                        qtr_key();
                        }
        if(key_typ==FALSE)
                        cyc_ctr=0;/* after key is released clear ctr*/
                }
/* global ltemp still contains current new or old long */
}
```

```
void job_idec(float);
/*include <int6811.h>
*************************************************************
  acs2.c
  Modified Jan,97                           C.S. Montgomery
*************************************************************/
#include <stdarg.h>
#include <stdio.h>
#include <io6811.h>
#include <ctype.h>
#include <ioacs.h>
#include <acsio.h>
#include <string.h>
#include <protos.acs>  /*prototyping file*/
/*************************************************************/
int       out=TRUE;
int       out_val=0;
extern    int       direction;
extern    int       run;
extern    unsigned int ic1raw;  /* actual raw passed to whoever wants it */
extern    unsigned int ic3raw;
extern    unsigned int ic2raw;
extern    float     Mix_flowmeter;
extern    float     Dry_feeder;
extern    float     Water_rate;
extern    float     Slurry_rate;
extern    float     Dry_rpm;
extern    float     old_total;
extern    int       water_direction;
extern    int       water_step_rate;
extern    int       dry_direction;
extern    int       dry_step_rate;
extern    int       timex;
extern    int       startup;
extern    float     Slurry_total;
extern    float     Dry_total;
extern    int       water_step_rate;
extern    int       dry_step_rate;
extern    int       Stages;
extern    int       oc4_on_time;
extern    int       oc3_on_time;
extern    int       oc3_pwm_max;
extern    int       oc3_pwm_min;
extern    int       oc4_pwm_max;
extern    int       oc4_pwm_min;
extern              int    steps;

/*
  ALGORITHM:
    BASE FLUID(% by vol of slurry) =
       (TARGET DENSITY #/GAL - CEMENT DENSITY(TRUE) #/GAL)/
       (BASE FLUID DENSITY #/GAL - CEMENT DENSITY(TRUE) #/GAL)

CEMENT(apparent % by vol. of slurry) =
       ((1-BASE FLUID % BY VOL)*(CEMENT DENSITY (TRUE) #/GAL))/
       (CEMENT DENSITY (APPARENT) #/GAL)
*/
extern          long    wpng[10];        /* base fluid density in #/gal */
```

```
    extern          long        Cppg_t[10];     /* cement density (true) #/gal */
    extern          long        Cppg_a[10];     /* cement density (apparent) #/gal */
    extern          long        ppg[10];        /* target slurry den. in #/gal */
    extern          long        Wsg[10];        /* base fluid percent of slurry by vol. */
    extern          long        Csg[10];        /* cement (apparent) percent of slurry by vol. */ extern          int         Stage_touched[10];
    extern          int         steps;
    extern          int         key_typ;
    extern          int         cyc_ctr;
    extern          int         stage_ctr;
    extern          int         ESC;
    extern          long        ltemp;
    extern          float       ftemp;

extern unsigned char   temp[16];
    extern          char        out_buf[MAXC_IN+1];
    extern          STDIN,STDOUT;  /*point getc -putc to proper buffer*/
    extern          TEXT        tmp_strng[64];
    extern          long        tmp_long;       /*used for atol and others*/
    extern          FILE        cfile[6];       /*make 6 comm files*/
    /*extern                    char            CH_TEXT;*/
    #define         com1        cfile[0]        /**SCI in ,used for floppy storage*/
    #define         com2        cfile[1]        /**SCI out, 9600 baud*/
    #define         com3        cfile[2]        /* io485 in 9600 during test*/
    #define         com4        cfile[3]        /* io485 out */
    #define         com5        cfile[4]        /* LCD out,2400 baud*/
    #define         com6        cfile[5]        /* LCD in (not used)*/

/***********************************************************************
    ***********************************************************************/

/* job data

Up to 10 stages. Each stage enter ppg,Wsg,Csg.
    */ job_data( )
    {
    int     STDOUT =comm5; /* lcd */
    int     cursor_x=10;
    int     cursor_y=2;
    int     fcount=2;
    int     acp_flg = FALSE;
    /*    */
    printf(CLRSCRN);
    printf("~\x11%c%c           Job Entry            ",1,1);
    printf("~\x11%c%cEnter/Edit Job Data",2,12);
    printf("~\x11%c%cClear Old Job Data",3,12);
    printf("~\x11%c%c",2,10);
    while (acp_flg == FALSE)
        {
        if(timex==TRUE)
            {
            time( );
            timex=FALSE;
            }  /*keep time on screen*/
        key_typ = key_chk( );
        if(key_typ == 4)
            {       /* increment */
            printf("~\x11%c%c ",((char)fcount),10);/*clear previous*/
            fcount=fcount+1;
            if( fcount >= 4)
```

```
                fcount = 2;
                printf("~\x11%c%c",((char)fcount),10); /*write new*/
                fwd_clr();
                } if(key_typ == 3)        /* decrement */
                {
                printf("~\x11%c%c ",((char)fcount),10);/*clear previous*/
                fcount--;
                if( fcount < 2)
                        fcount = 3;
                printf("~\x11%c%c)",((char)fcount),10); /*write new*/
                rev_clr();
                }
                                        /* now check accept */
        if(key_typ == 1)
                {
                acp_flg = TRUE;
                acp_clr();
                }
        if(key_typ==2)
                {
                esc_clr();
                acp_flg = TRUE; /* allow escapes */
                return;
                }
        }
switch (fcount){
        case 2:
                        set_job_data();
                        break;
        case 3:
                        clear_job_data();
                        break;
        default:
                        return;
                        break;
        }
}
/****************************************************************/ clear_job_data()
{
int stagex_ctr=0;

while (stagex_ctr<10) /* 0-9 locations*/
        {
        Wsg[stagex_ctr]=(long)(59000); /* default to 50% water */
        Csg[stagex_ctr]=(long)(85000); /* default to 94% cement */
        ppg[stagex_ctr]=(long)(15600);    /* unused */
        Stage_touched[stagex_ctr]=FALSE; /* programmed or not flag */
        stagex_ctr++;
        }
steps=0;
startup=TRUE; /* put back in start up mode */
Slurry_total=0;
Dry_total=0;
water_step_rate=0;
dry_step_rate=0;
Stages=0;    /* number of stages input */
stage_ctr=0;
old_total=0;
}
/****************************************************************/
```

53

```
set_job_data()
{
        int     STDOUT =comm5; /* lcd */
        int     cursor_x=31;
        int     cursor_y=3;
        int     fcount;
        int     acp_flg = FALSE;
        int     exit=FALSE;
        int     exit2=FALSE;
        long    oldwprent, oldcprent, oldppg, oldwppg, oldcppg_t, oldcppg_a;

fcount=30; /* timeout counter */
stage_ctr=0;
printf(CLRSCRN);
printf("~\x11%c%c            Use INC/DEC",1,1);
printf("~\x11%c%c           Stage to Edit/Enter?      ",2,1);
printf("~\x11%c%c                                ) %2d",3,1,stage_ctr+1);
printf("\x11%c%cCement %5.2f%%, Water %5.2f%% ",4,1,
(float)(Csg[stage_ctr])/1000.0, (float)(Wsg[stage_ctr])/1000.0 );

while(exit2==FALSE)
    {
        if(timex==TRUE)
            {
            timex=FALSE;
            fcount--;
            if(fcount<12)
                    printf("~\x11%c%c%2d Seconds ",3,1,fcount);
            if(fcount<=0)
                    return; /* timeout */
            }
        key_typ=key_chk();
        if(key_typ==4) /*inc*/
            {
            stage_ctr++;
            if(stage_ctr>=10)
                    stage_ctr=9;
            if(stage_ctr > Stages)
                {
                stage_ctr=Stages;
                printf("~\x11%c%c                END> %2d ",3,1,stage_ctr+1);
                }
            else
                    printf("~\x11%c%c                    ) %2d ",3,1,stage_ctr+1);
            hlf_key(); /* allow recycle */
            printf("~\x11%c%cCement %5.2f%%, Water %5.2f%% ",4,1,
(float)(Csg[stage_ctr])/1000.0, (float)(Wsg[stage_ctr])/1000.0 );
            fcount=30;
            }
        if(key_typ==3) /*dec*/
            {
            stage_ctr--;
            if(stage_ctr<0)
                    stage_ctr=0;
            printf("~\x11%c%c                   ) %1d ",3,1,stage_ctr+1);
            hlf_key(); /* allow recycle */
            printf("~\x11%c%cCement %5.2f%%, Water %5.2f%% ",4,1,
(float)(Csg[stage_ctr])/1000.0, (float)(Wsg[stage_ctr])/1000.0 );
            fcount=30;
            }
        if(key_typ == 2) /* then hard exit screen*/
            {
            printf("~\x11%c%c FINISHED ",1,1);
            esc_clr();
            exit2=TRUE;
```

```
            }
        if(key_typ == 1) /* Change data for this step */
            {
            fcount=30;
            exit=FALSE;

oldwprcnt=Wsg[stage_ctr];
            oldcprcnt=Csg[stage_ctr];
            oldppg=ppg[stage_ctr];
            oldwppg=Wppg[stage_ctr];
            oldcppg_t=Cppg_t[stage_ctr];
            oldcppg_a=Cppg_a[stage_ctr];

while(exit==FALSE)
                {
                printf(CLRSCRN);
                acp_clr();

/* do target ppg */
                ltemp=ppg[stage_ctr];
                if(!ltemp)
                    ltemp=15600;
                ftemp=(float)ltemp/1000;
                printf("~\x11%c%c Inc/Dec to change:     !Stage %2d ",1,1,stage_ctr+
                printf("~\x11%c%c)Target ppg %2.2f  ",2,1,ftemp);
                get_ideclong(99.99);
                ppg[stage_ctr]=ltemp;
                /* store ppg and display in done corner, x1000
                already factored in */
                printf("~\x11%c%c Target ppg %2.2f  ",2,1,ftemp);

/* Do Wppg, base fluid ppg */
                ltemp=Wppg[stage_ctr];
                ftemp=(float)ltemp/1000;
                printf("~\x11%c%c)Base Fl. ppg %2.2f",2,20,ftemp);
                get_ideclong(99.99);
                Wppg[stage_ctr]=ltemp;
                /* store Wppg and display in done corner, x1000
                already factored in */
                printf("~\x11%c%c Base fl. ppg %2.2f",2,20,ftemp);

/* now do Cppg_t, cement density(true) in ppg */
                ltemp=Cppg_t[stage_ctr];
                ftemp=(float)ltemp/1000;
                printf("~\x11%c%c)Tru Cem ppg %2.2f",3,1,ftemp);
                get_ideclong(99.99);
                Cppg_t[stage_ctr]=ltemp; /* x1000 factor already in */
                printf("~\x11%c%c Tru Cem ppg %2.2f",3,1,ftemp);/*print entered cem /* now do Cppg_a, cement density(apparent) in ppg */
                ltemp=Cppg_a[stage_ctr];
                ftemp=(float)ltemp/1000;
                printf("~\x11%c%c)App Cem ppg %2.2f",3,20,ftemp);
                get_ideclong(99.99);
                Cppg_a[stage_ctr]=ltemp;
                printf("~\x11%c%c App Cem ppg %2.2f",3,20,ftemp);

/* now do algorithm for Wsg, % base fluid by volume of slurry */
                ftemp=((float)ppg[stage_ctr] - (float)Cppg_t[stage_ctr])
                                    /
                      ((float)Wppg[stage_ctr] - (float)Cppg_t[stage_ctr]);
                ftemp=ftemp*100000;
                ltemp=(long)ftemp;
                Wsg[stage_ctr]=ltemp;

/* now do algorithm for Csg, % cement(apparent) by vol of slurry */
```

55

```
                            ftemp=(    - ftemp/100000);
                            ftemp=(ftemp)*((float)Cppg_t[stage_ctr]
                                          /
                                          (float)Cppg_a[stage_ctr]);
                    ftemp=ftemp*100000;
                    ltemp=(long)ftemp;
                    Csg[stage_ctr]=ltemp;

/* accept or change parameters */
                    printf("~\x11%c%c)Accept Parameters? ACP/ESC",4,1);/* accept ? */
                    ESC=FALSE;
                    while (ESC==FALSE)
                            {
                            key_typ=key_chk();
                            if(key_typ==1)/* accp */
                                    {
                                    ESC=TRUE;
                                    exit=TRUE;
                                    stage_ctr++;
                                    if(stage_ctr>9)
                                            exit2=TRUE;
                                    if(stage_ctr>Stages)
                                            Stages=stage_ctr;
                                    printf("~\x11%c%c ACCEPTED step %2d data    ",4,1,stage_ctr);
                                    acp_clr();
                                    }
                            if(key_typ==2)/* esc*/
                                    {
                                    Wsg[stage_ctr]=oldwprcnt; /* restore old data */
                                    Csg[stage_ctr]=oldcprcnt;
                                    ppg[stage_ctr]=oldppg;
                                    Wppg[stage_ctr]=oldwppg;
                                    Cppg_t[stage_ctr]=oldcppg_t;
                                    Cppg_a[stage_ctr]=oldcppg_a;

printf("~\x11%c%c REFUSED step %2d data    ",4,1,stage_ctr+1);
                                    esc_clr();
                                    exit=TRUE; /* go back to step selection */
                                    ESC=TRUE;
                                    }
                            }
                    printf(CLRSCRN);
                    /*          123456789012345678901234567890123456789*/
                    printf("~\x11%c%c         Use INC/DEC",1,1);
                    printf("~\x11%c%c         Stage to Edit/Enter?      ",2,1);
                    printf("~\x11%c%c                  ) %1d",3,1,stage_ctr+1);
                    }
            }
    }
/*************************************************************/
/* hlx is the upper limit on input */
void job_ldec(float hlx)
{
int acp_flg; /* preset*/
cyc_ctr=0; /* ftemp,ltemp,cyc_ctr, and ESC are globals */ while(acp_flg==FALSE)
        {
        if(timex==TRUE)
                timex=FALSE;
        key_typ=key_chk();
        if(key_typ == 1) /* then normal exit*/
                {
```

```
                ESC=FALSE;
                acp_flg=TRUE;
                acp_clr();
                }
        if(key_typ == 2) /* then hard exit screen*/
                {
                ESC=TRUE;        /* global flag*/
                esc_clr();
                return;
                }
        if(key_typ == 4) /*inc */
                {
                direction=UP; /*increment*/
                log_scale();/* scale the long and update ftemp*/
                if( ftemp>hlx)
                        {
                        ftemp=hlx;
                        ltemp=(long)(ftemp*1000); /* clamp out */
                        }
                printf("~\x11%c%c%5.2f   ",2,11,ftemp);
                cyc_ctr++;
                qtr_key();
                }
                                /*check dec*/
        if(key_typ == 3) /*dec k factor */
                {
                direction=DOWN;
                log_scale();/* flt,int*/
                printf("~\x11%c%c%5.2f   ",2,11,ftemp);
                cyc_ctr++;
                qtr_key();
                }
        if(key_typ==FALSE)
                {
                cyc_ctr=0; /* after key is released clear ctr */
                }
        }
/* global ltemp still contains current new or old long */
}
```

```
/*include (int6811.h)
*****************************************************************
acs3.c
Modified JAN, 97                         C.S. Montgomery
*****************************************************************/
#include <stdarg.h>
#include <stdio.h>
#include <io6811.h>
#include <ctype.h>
#include <ioacs.h>
#include <acsio.h>
#include <string.h>
#include <protos.acs> /*prototyping file*/

/* -------  Tub Level Filter Parameters  ---------*/
#define CUTOFF          9       /* tub won't run out with this */
/*****************************************************************/
int     disable_inputs=FALSE;
int     first_pass=FALSE;

float   diff=0;
float   Running_Wsg;
float   Running_ppg;
float   Running_Csg;
float   Target_sg;
float   corrected_target_sg;
float   corrected_reference=0;
float   error_ppg=0;
float   old_total=0;
float   stage_total=0;
extern  int     startup;
extern  int     reference_clock;
extern  int     Slurry;
extern  int     Staged;
int     water_step_rate=0;
int     dry_step_rate=0;
long    level_temp=0;
int     level=0;
int     density=0;
int     density_ctr=0;
int     level_ctr=0;
int     steady_ctr=0;
int     water_ctr;      /* Fresh water counter,# secs without fresh water */
int     Steady=FALSE;
int     old_inch_count=0;
int     inch_count=0;
long    l_temp;
float   f_temp;
float   f_test;
float   f2_test;
float   ref_adjust=0;
float   reference_tub_adjust=0;
float   Dry_rpm=0;
float   Dry_total=0;
float   Cu_ft_min_dry=0;
float   Water_rate=0;
float   Water_total=0;
float   Slurry_rate=0;
```

```
    float   corrected_slurry=0;
    float   slurry_total=0;
    float   Water_percent=0;
    float   Cement_percent=0;
    float   Water_demand=0;
    float   Correction_span=0;
    float   T_Correction_span=0;
    float   W_Correction_span=0;
    float   Dry_gallons_minute=0;
    float   Dry_demand=0;
    float   inches=0;
    float   reference=0;
    float   real_ppg=0;

extern float   density_min;
    float   density_mul;
    float   disc_mul;
    float   disc_min;
    float   level_mul;
    float   level_min;
    float   cement_mul;
    float   cement_min;

extern unsigned char CHANX;
    extern unsigned char KDATA;
    extern unsigned char DACDATA;

extern long    stab_error_window;
    extern long    auto_percent_correction;
    extern long Discharge_flowmeter;
    extern long Dry_feeder;
    extern long Mix_flowmeter;
    extern float w_gain;
    extern float d_gain;
    extern float   Dry_start_response;
    extern float   Dry_run_response;

extern int   oc4_pwm_max;
    extern int   oc4_pwm_min;
    extern int   oc3_pwm_max;
    extern int   oc3_pwm_min;
    extern int   timex;
    extern long k_offset[MAXCHANNELS];
    extern long kMAX_analog[MAXCHANNELS];
    extern long kMIN_analog[MAXCHANNELS];
    extern int density_check;
    extern int flow_check;
    extern int init_cntr;
    /* output capture stuff */
    unsigned int temp_oc4=0;
    unsigned int temp_oc3=0;
    float    w_gain_factor=0;
    float    d_gain_factor=0;
    float    t_gain_factor=0;
    float   s_time=0;
    float   h_time=0;
    float   k_span;
    int     dry_mode=OFF;
    int     oc4_on_time=0;
    int     oc4_off_time=0;
    int     oc3_on_time=0;
    int     oc3_off_time=0;
    int     water_mode=OFF;
    int     water_direction=DOWN;
    int     t_direction=DOWN;
    int     dry_direction=DOWN;
```

```
int     d_direction=DOWN;

int     LevelCtr=0;
int     oldlvl=0;
int     newlevel=0;
int     first_pass2=TRUE;
int     dx1=0;
int     dx2=0;
float   cement_wt;

int     dac0;
int     dac1;

extern          unsigned int ic1raw;  /* actual raw passed to whoever wants it */
extern          unsigned int ic2raw;
extern          unsigned int ic3raw;

extern          unsigned long   ic1tot;  /* absolute pulse totals */
extern          unsigned long   ic2tot;
extern          unsigned long   ic3tot;

extern          unsigned long   ic1temp;/* averaging temp */
extern          unsigned long   ic2temp;
extern          unsigned long   ic3temp;

extern          unsigned int    ic1_old;/* to do new-old=period */
extern          unsigned int    ic2_old;
extern          unsigned int    ic3_old;

extern          int     ic1_ctr;/* to keep track of divide by 4 front */
extern          int     ic2_ctr;/* end raw average */
extern          int     ic3_ctr;

extern          int     time_out1;
extern          int     time_out2;
extern          int     time_out3;

extern          int     run;
extern          int     steps;
extern          long    Wsg[10];
extern          long    ppg[10];
extern          long    Csg[10];
extern          int     Stage_touched[10];

extern          int     key_typ;
extern          int     stage_ctr;
extern          int     ESC;

extern unsigned char temp[16];
extern          char    out_buf[MAXC_IN+1];
extern          STDIN,STDOUT;   /*point getc -putc to proper buffer*/
extern          int             scnt;
extern          int             btst;
extern          int             seconds;
extern          int             secflag;
extern          int             key_flg;/*.25 sec key switch check flag*/
extern          int             milclok;  /*initialize clocks*/
extern          int             tsec;    /*below used in RTC routines */
extern          int             tmin;
extern          int             thr;
extern          int             tpam;   /*am/pm*/
extern          int             old_sec;
extern          int             start_flg;
extern          int             STAT;
extern          TEXT            anlog_str[64];
```

```
extern      TEXT                count_str[64];
extern      TEXT                tmp_strng[64];
extern      long                tmp_long;        /*used for atol and others*/
extern      FILE                cfile[6];        /*make 6 comm files*/
/*extern    char                CH_TEXT;*/
#define     com1    cfile[0]    /*SCI in ,used for floppy storage*/
#define     com2    cfile[1]    /*SCI out, 9600 baud*/
#define     com3    cfile[2]    /* io485 in 9600 during test*/
#define     com4    cfile[3]    /* io485 out */
#define     com5    cfile[4]    /* LCD out,2400 baud*/
#define     com6    cfile[5]    /* LCD in (not used)*/
/************************************************************************/
/* A coefficient of zero means the pwm signal will "hold" */
/*int Coefficient[32]={0,0,0,1,1,1,1,1,1,1,1,1,1,1,1,1, ratiometer
        1,1,1,1,2,2,2,2,2,2,2,2,2,2,2,2};  mix water pump */
/*int S_Coefficient[32]={3,3,4,5,5,5,5,5,6,6,6,6,6,6,7,7,water start up
        8,9,9,10,10,11,11,12,14,16,17,18,19,20,20,20}; */
/*int S_Coefficient[32]={1,1,1,2,2,2,2,2,2,2,2,2,1,1,2,1, use this one
        2,2,2,3,3,3,4,4,5,5,6,7,8,9,10}; */
/************************************************************************/

/* real */
int     EnableGainAdjust = FALSE;   /* Added to control gain adjust */
int     DryGainAdjust = FALSE;      /* on the fly   7/11/94   RRP */
int     WaterGainAdjust = FALSE;
int     TubFactorAdjust = FALSE;
int     StabTimeAdjust = FALSE;
int     HoldoffTimeAdjust = FALSE;
int     pauser;
int     DoneGain=FALSE;
extern int TubGain;
long    water_correction;
/************************************************************************/ run_acs()
{
int     STDOUT =comm5;  /* lcd */
int     old_stage=0;
int     steady_ctr=0;
int     key,temp;

startup=TRUE;   /* reset start timer */
stage_ctr=0;
printf(CLRSCRN);
qtr_key();
/* do calc first time */
        seconds=0;
        Water_total=0;  /* reset totalizer */
        startup=TRUE;
        ESC=FALSE;

k_span=((float)kMAX_analog[LEVEL_CH]-(float)kMIN_analog[LEVEL_CH]);
        level_mul=k_span/((ADBIT-(float)k_offset[LEVEL_CH]));/*auto scale*/
        level_min=((float)kMIN_analog[LEVEL_CH])/1000;/*get scale offset adder */ k_span=((float)kMAX_analog[DISCHARGE_CH]-(float)kMIN_analog[DISCHARGE_CH]);
        disc_mul=k_span/((ADBIT-(float)k_offset[DISCHARGE_CH]));/*auto scale*/
        disc_min=((float)kMIN_analog[DISCHARGE_CH])/1000;/*get scale offset adder */ k_span=((float)kMAX_analog[DENSITY_CH]-(float)kMIN_analog[DENSITY_CH]);
        density_mul=k_span/((ADBIT-(float)k_offset[DENSITY_CH]));/*auto scale*/
        density_min=((float)kMIN_analog[DENSITY_CH])/1000;/*get scale offset adder */ k_span=((float)kMAX_analog[CEMENT_CH]-(float)kMIN_analog[CEMENT_CH]);
        cement_mul=k_span/((ADBIT-(float)k_offset[CEMENT_CH]));
        cement_min=((float)kMIN_analog[CEMENT_CH]/1000);
```

```
        if(Stages==0)
                return; /* don't run if no program put in */
        else
            {
/*                    12345678901234567890123456789012345678990*/
            printf(""\x11%c%cREAL PPG          | TARGET PPG          ",1,1);
            printf(""\x11%c%cDIS RATE          | BASE RATIO          ",2,1);
            printf(""\x11%c%cBASE RATE         | STAGE               ",3,1);
            printf(""\x11%c%cTOTAL                                   ",4,1);
            }
        while((stage_ctr<Stages) && (ESC == FALSE))
            {
            while(timex==FALSE)
                {
                ;
                }
            timex=FALSE;
            key_typ=key_chk();
            if(key_typ == 2)
                    ESC=TRUE;
            if(key_typ ==4)
                    {
                    Wsg[stage_ctr]-=50; /* add .02% of cement*/
                    Csg[stage_ctr]+=50;
                    }
            if(key_typ ==3)
                    {
                    Wsg[stage_ctr]+=50; /* subtract .02% of cement*/
                    Csg[stage_ctr]-=50;
                    }
            if(key_typ == 5)        /* stage button pressed */
                    {
                    stage_ctr++;
                    if(stage_ctr>=Stages-1)   /* end of program */
                        {
                        stage_ctr=Stages-1;
                /*      printf(""\x11%c%cFINAL",3,26);  */
                        }
                    }
            run_time();
            }
        run=FALSE; /* turn off devices */
        clear_dacs();   /* Zero all outputs */
        ESC=FALSE;
        }

/**************************************************************************/
run_time()       /* main sub run-time loop */
    {
    int          temp;
    long         t_long;
    float        k_span,mul,min,gtemp; /* for zero and span*/
    unsigned     char *_data;
    unsigned     char *_chanx;
    float        fftemp;

run=TRUE; /* set run flag. Anything goes wrong will kill the run */

/* generate rates/totals, do floating point calcs */
    /* interrupts are running free during all of this time */

/*--------------first scale level control , result is real inches  */
    newlevel = ((long)do_a_d(LEVEL_CH)) - k_offset[LEVEL_CH];
    if(newlevel<=0)
```

```c
            newlevel=0;
    inches=(((float)newlevel * level_mul)/1000)+ level_min; /* scale and add display offset*/
    inches+=.3;  /* 0.? = INT divide round-off error from smoothing/averaging*/
    if(inches<6)
            inches = 6;

/*_____ get discharge rate & total in gallons _____*/
    l_temp = ((long)do_a_d(DISCHARGE_CH)) - k_offset[DISCHARGE_CH];
    if(l_temp <= 0)
            l_temp=0;
    Slurry_rate=(((float)l_temp * disc_mul)/1000)+ disc_min; /* scale and add display offset*/
    if(Slurry_rate<=0)
            Slurry_rate = 0;
    Slurry_total+=Slurry_rate/60.0; /* totalize rate */

/*_____ dry feeder calculations in RPM_____*/
    /* NOTE!!!   quadio was built with IC3 on F1 and IC1 on F3 */
    if (time_out1==TRUE)    /* zero hertz in */
            ic1raw = 0;
    time_out1=TRUE; /* set timeout to fail if no input within 1 sec */
    if (ic1raw > 0)
            {
            l_temp=CRYSTAL/(unsigned)ic1raw;  /*get dry feeder frequency */
            Dry_rpm=( ((float)l_temp) / ((float)Dry_feeder) ) *60;
            l_temp=Dry_feeder * 60; /* use same k factor as rate  */
            f_temp=((float)ic1tot)*1000;   /* 3dp adjust */
            Dry_total=f_temp/(float)l_temp;
            }
    else
            Dry_rpm=0;

/*_____ mix water flow rate & total in ft^3_____*/
    /* NOTE!!!  Quadio has IC1 and IC3 swapped on the circuit board ! */
    if (time_out3==TRUE)
            ic3raw = 0;
    time_out3=TRUE; /* set timeout to fail if no input within 1 sec */
    if(ic3raw > 0)
            {
            l_temp=CRYSTAL/(unsigned)ic3raw; /* get suction frequency */
            Water_rate=(60.0*(float)l_temp)/((float)Mix_flowmeter);
            l_temp=Mix_flowmeter * 60;/* assume per min */
            f_temp=((float)ic3tot)*1000;   /* 3dp adjust*/
            Water_total=f_temp/(float)l_temp;
            }
    else
            Water_rate=0;

/*_____ scale density , result is real ppg_____*/
    l_temp=((long)do_a_d(DENSITY_CH)) - k_offset[DENSITY_CH];
    if(l_temp<0 )
            l_temp=0;
    real_ppg=(((float)l_temp*density_mul)/1000) + density_min;  /* scale and add display offset*/

/*_____get the Cement weight_____*/
    l_temp = ((long)do_a_d(CEMENT_CH)) - k_offset[CEMENT_CH];
    if(l_temp <= 0)
            l_temp=0;
    cement_wt=(((float)l_temp * cement_mul)/1000)+ cement_min; /* scale and add display offset*/
    if(cement_wt<=0)
            cement_wt = 0;

/*
    /* test to see if the dryfeeder is running with no fresh water */
    if(( Water_rate < 0.67 ) && ( Dry_rpm > 2))  /* no water */
```

```c
    {
    printf("~\x11%c%cNO WATER!!",4,15);  /* ERror message */
    water_ctr++;
    if(water_ctr>7)
        {
        run=FALSE;   /* no fresh water for 7 seconds during run */
        ESC=TRUE;
        }
    }
else
    {
    if(water_ctr!=0)
        printf("~\x11%c%c          ",4,15);  /* erase error message */
    water_ctr=0;  /* reset timer */
    }
*/
/* now check min rate and tub(inch_print) safety */
/*
if(inches<CUTOFF)
    {
    run=FALSE;
    printf("~\x11%c%cOVERFILL   ",4,15);
    }
*/
/* Note: the interrupt "tasks" do raw filtering. */
/* The foreground only sets up target requests/changes */
/*_____ dry calculations _____*/
/*   */
/*   note: volume is based on xx%ve of a 0.889 ft^3/rpm feeder */

Cu_ft_min_dry= 0.889 * Dry_rpm;
Dry_demand = Slurry_rate * ((float)Csg[stage_ctr]/100000);   /* in ft^3/min */
Water_demand = Slurry_rate * ((float)Wsg[stage_ctr]/100000); /* in ft^3/min */

/* now do output to the DACS */
if(run==FALSE)
    clear_dacs();
else
    {
    /* output cement and water data */
    /* set output channel pointers */
    _data = &DACDATA;
    _chanx = &CHANX;
/* Water rate is in ft^3/min, output 5v at 60ft^3 */
    temp=(int)(Water_demand*4.25);
    if(temp>255) temp=255;
    if(temp<0) temp=0;
    dac0=temp;
    *_data=(unsigned char) temp;
    *_chanx=(unsigned char) 1;
    SETDAC();

/* Cement rate in ft^3/min, output 5v at 60ft^3 */
    temp=(int)(Dry_demand*4.25);
    if(temp>255) temp=255;
    if(temp<0) temp=0;
    dac1=temp;
    *_data=(unsigned char) temp;
    *_chanx=(unsigned char) 2;
    SETDAC();

/* Slurry is in ft^3/min, output 5v at 60ft^3 */
    temp=(int)(Slurry_rate*4.250);
    if(temp>255) temp=255;
```

```c
            if(temp<0) temp=0;
            r_data=(unsigned char) temp;
            *_chanx=(unsigned char) 4;
            SETDAC();

/* Density servo feedback routine */
            fftemp=ppg[stage_ctr]/1000.0;
            if(Slurry_rate > 5)
              {
                if(real_ppg < (fftemp-0.1))
                  {
                    if(real_ppg < (fftemp-1.0))
                      Wsg[stage_ctr]=Wsg[stage_ctr]-20;
                    else
                      Wsg[stage_ctr]=Wsg[stage_ctr]-10;
                  }
                if(real_ppg > (fftemp+0.1))
                  {
                    if(real_ppg > (fftemp+1.0))
                      Wsg[stage_ctr]=Wsg[stage_ctr]+20;
                    else
                      Wsg[stage_ctr]=Wsg[stage_ctr]+10;
                  }
              }
            }
display_acs();  /* call display routine */
}
/*****************************************************************/

/*****************************************************************/
void    vectoc3(void)                   /*timer interrupt flag reset value */
#define timsk3  0x20
{
            TFLG1 = timsk3;             /*resets enable*/
            temp_oc3=TCNT;              /* capture present time */
}
/*****************************************************************/ void    vectoc4(void)                   /*timer interrupt flag reset value */
define timsk4  0x10

{
            temp_oc4=TCNT;              /* capture present time */
            TFLG1 = timsk4;             /*resets enable*/
}
/*****************************************************************/

/*****************************************************************/
void    vectIC1(void)                   /* */
#define timsk5  0x04                    /*timer interrupt flag reset value */

{
unsigned int ic;
            TFLG1 = timsk5;             /*resets enable*/
            ic=TIC1;
            if (disable_inputs==TRUE) {;}
            else
```

```c
            ic1temp=ic1temp+((unsigned long)(ic-ic1_old));  /* raw period for foreground or other */
            ic1_old=ic;     /* store for next time */
            ic1_ctr++;
            if(ic1_ctr==16)
                            {
                            ic1_ctr=0;
                            ic1raw=ic1temp/16;  /* average 16 times */
                            ic1temp=0;
                            time_out1=FALSE;
                            }
            ic1tot++;  /* totals long*/
            }
}
/**********************************************************************/
void    vectIC2(void)                   /* discharge flowmeter, no longer used */
#define timsk6  0x02                    /*timer interrupt flag reset value */

{
unsigned int ic;
        TFLG1 = timsk6;                 /*resets enable*/
}

/**********************************************************************/
/*              Insert VECTIC3 and 4 here--*/ void    vectIC3(void)
define timsk7  0x01                    /*timer interrupt flag reset value */

{
        unsigned int ic;
TFLG1 = timsk7;                         /*resets enable*/
ic=TIC3;
if (disable_inputs==TRUE) {;}
else
        {
        ic3temp=ic3temp+((unsigned long)(ic-ic3_old));  /* raw period for foreground or other */
        ic3_old=ic;     /*store for next time */
        ic3_ctr++;
        if(ic3_ctr==16)
                {
                ic3_ctr=0;
                ic3raw=ic3temp/16;
                ic3temp=0;
                time_out3=FALSE;
                }
        ic3tot++;  /* totals long*/
        }
}
/**********************************************************************/
void    vectIC4(void)                   /* not currently used */
#define timsk8  0x08                    /*timer interrupt flag reset value */

{
unsigned int ic;
        TFLG1 = timsk8;                 /*resets enable*/

}
/**********************************************************************/
```

```
/*include <int6811.h>
*****************************************************************
    acs4.c
Display to LCD
Allen Kitchen 1/96
Modified Jan, 97              C.S. Montgomery
*****************************************************************/
#include <stdarg.h>
#include <stdio.h>
#include <io6811.h>
#include <ctype.h>
#include <ioacs.h>
#include <acsio.h>
#include <string.h>
#include <protos.acs> /*prototyping file*/
/****************************************************************/
int        dsp_ctr=0;
unsigned char   dac_ctr=0;
extern int      tune;
extern int      w_gain_factor;
extern int      d_gain_factor;
extern float    t_gain_factor;
extern float    s_time;
extern float    h_time;
extern int      init;
extern int      Steady;
extern int oc4_on_time;        /* for display only during test */
extern int Auto;
extern int tub_timer;
extern float    corrected_reference;
extern float Water_demand;
extern float reference_tub_adjust;
extern float    Dry_gallons_minute;
extern float    Cement_percent;
int     stager=0;
int     trimmer=0;
extern int dry_direction;
extern int d_direction;
extern float old_total;
extern Correction_span;
extern float stage_total;
extern float    Running_Wsg;
extern float    Running_ppg;
extern float    Running_Csg;
extern float    Target_sg;

extern  unsigned char CHANX;
extern  unsigned char KDATA;
extern  unsigned char DACDATA;

extern int      timex;
extern int      Stages;
extern int      startup;
extern int      stage_ctr;
extern int      Slurry;
extern long     l_temp;
extern float    f_temp;
extern float    corrected_slurry;
extern float    Dry_rpm;
```

```c
extern   float    Dry_total;
extern   float    Cu_ft_min_dry;
extern   float    Water_rate;
extern   float    Water_total;
extern   float    Slurry_rate;
extern   float    Slurry_total;
extern   float    Water_percent;
extern   float    Cement_percent;
extern   float    Water_demand;
extern   float    Dry_gallons_minute;
extern   float    Dry_demand;
extern   float    inches;
extern   float    reference;
extern   float    real_ppg;
extern   float    cement_wt;

extern       int    dac0;
extern       int    dac1;

extern       int    tub_adjust_lo;
extern       int    tub_adjust_hi;

extern       int    run;
extern       int    steps;
extern       long   Wsg[10];
extern       long   ppg[10];
extern       long   Csg[10];
extern       int    Stage_touched[10];
extern       int    key_typ;
             int    key_typ1=0;
extern       float  h1;

extern       int    stage_ctr;
extern       int    ESC;
extern       long   ltemp;
extern       float  ftemp;

extern int   EnableGainAdjust;
extern int   DryGainAdjust;
extern int   DoneGain;
extern int   WaterGainAdjust;
extern int   TubFactorAdjust;
extern int   StabTimeAdjust;
extern int   HoldoffTimeAdjust;
extern unsigned char temp[16];
extern       char   out_buf[MAXC_IN+1];
extern       STDIN,STDOUT;   /*point getc -putc to proper buffer*/
extern       int    key_flg;/*.25 sec key switch check flag*/
extern       TEXT   anlog_str[64];
extern       TEXT   count_str[64];
extern       TEXT   tmp_strng[64];
extern       long   tmp_long;       /*used for atol and others*/
extern       FILE   cfile[6];       /*make 6 comm files*/
#define      com1   cfile[0]        /*SCI in ,used for floppy storage*/
#define      com2   cfile[1]        /*SCI out, 9600 baud*/
#define      com3   cfile[2]        /* io485 in 9600 during test*/
#define      com4   cfile[3]        /* io485 out */
#define      com5   cfile[4]        /* LCD out,2400 baud*/
#define      com6   cfile[5]        /* LCD in (not used)*/

/* below for reference only */
/*           12345678901234567890123456789012345678890
printf("~\x11%c%cREAL PPG       | TARGET PPG       ",1,1);
printf("~\x11%c%cDIS RATE       | BASE RATIO       ",2,1);
PRINTF("~\X11%c%cBASE RATE      | STAGE            ",3,1);
printf("~\x11%c%cTOTAL                             ",4,1);
```

```
*/
display_acs()
{
int i_temp;
int     std_tmp=STDOUT;
static int    dis_count;

/* First write to the LCD */
        STDOUT=comm5;
        time();

printf("~\x11%c%c%2.1f ",1,11,real_ppg);
        printf("~\x11%c%c%2.1f ",1,34,ppg[stage_ctr]/1000.0);
        printf("~\x11%c%c%2.1f ",2,11,Slurry_rate);
        printf("~\x11%c%c%1.2f ",2,34,Wsg[stage_ctr]/1000.0);
        printf("~\x11%c%c%2.1f ",3,11,Water_rate);
        printf("~\x11%c%c%1d of %1d ",3,28,stage_ctr+1,Stages);
        printf("~\x11%c%c%6.1f ",4,7,Slurry_total);

/* now write to the serial port */
        STDOUT=comm2;
        printf("@,0,%4.1f,21,",Water_rate);      /* fresh water rate */
    /*  printf("@,1,%4.1f,21,",Cu_ft_min_dry);     dry cement rate */
        printf("@,2,%4.1f,21,",Slurry_rate);     /* slurry rate */
        printf("@,3,%4.1f,13,",real_ppg);        /* density */
        printf("@,4,%6.1f,22,",Slurry_total);    /* total discharged */
STDOUT= std_tmp;
}

/*****************************************************************/
clear_dacs()
{
        char i;
        unsigned char *_data;
        unsigned char *_chanx;

_data=&DACDATA;
_chanx=&CHANX;
for(i=1; i<5 ; i++)
        {
        *_data=(unsigned char)0;
        *_chanx=i;
        SETDAC();
        }
}

/*****************************************************************/
set_sens()/* frequency inputs*/
{
        unsigned int *xptr;
        unsigned int pass;

xptr=&pass;

*xptr=0x0500; /*    was 0a   */
dac(pass);

*xptr=0x0632;
dac(pass);

*xptr=0x0764;
```

```
*xptr=0x0764;
dac(pass);
*xptr=0x0864;
dac(pass);
}
```

We claim:

1. A method for controlling the density of a cement slurry in a system comprising a mix water pump and input line, a dry cement hopper with a regulating valve, and a mixing chamber for receiving and mixing the mix water and cement to produce a cement slurry, comprising the steps of:

measuring the slurry discharge rate from the mixing chamber;

determining the percentage of mix water by volume in the slurry;

regulating the mix water flow rate to the mixing chamber to substantially equal the slurry discharge rate multiplied by the percentage of mix water by volume in the slurry;

measuring the slurry level in the mixing chamber;

regulating the dry cement flow rate to the mixing chamber; and adjusting the regulating valve based on the measured slurry level to maintain the slurry level in the mixing chamber substantially constant.

2. The method of claim 1, further comprising the steps of:

measuring the density of the slurry discharged from the mixing chamber;

comparing the measured slurry density with a desired slurry density; and adjusting the flow rate of the mix water to the mixing chamber based upon the comparison of the measured and desired slurry densities.

3. The method of claim 2, wherein the step of regulating the mix water flow rate comprises the steps of:

calculating a desired mix water flow rate equal to the slurry discharge rate multiplied by the percentage of mix water by volume in the slurry;

measuring the mix water flow rate to the mixing chamber; and adjusting the speed of the mix water pump with a servo-loop to regulate the measured mix water flow rate substantially equal to the desired mix water flow rate.

4. The method of claim 2, wherein the step of regulating the mix water flow rate comprises the steps of:

generating a mix water feedback signal representative of the measured mix water flow rate;

calculating a desired mix water flow rate equal to the slurry discharge rate multiplied by the percentage of mix water by volume in the slurry;

generating a command signal representative of the desired mix water flow rate; and adjusting the speed of the mix water pump with a control signal from a servo-loop receiving the mix water feedback signal and the command signal to regulate the measured mix water flow rate substantially equal to the desired mix water flow rate.

5. The method of claim 4, wherein the step of adjusting the regulating valve comprises the steps of:

generating a slurry level feedback signal representative of the measured slurry level;

generating a reference signal representative of a desired slurry level; and adjusting the position of the regulating valve with a control signal from a second servo-loop receiving the slurry level feedback signal and the reference signal to regulate the measured slurry level substantially equal to the desired slurry level.

6. The method of claim 5, further comprising the step of:

generating the mix water feedback signal, command signal, cement feedback signal, and reference signal with a microprocessor based system controller.

7. A method of controlling the density of a slurry of cement and mix water, comprising the steps of:

injecting mix water into a mixing chamber;

injecting dry cement into a mixing chamber;

mixing the mix water and dry cement to form a slurry;

opening a discharge valve to discharge the slurry from the mixing chamber;

measuring the discharge rate of the slurry;

calculating the fraction of mix water in the discharging slurry from a desired slurry density, the density of the cement, and the density of the mix water according to the relation $$\frac{\text{fraction of mix water}}{\text{in discharge slurry}} = \frac{(\text{desired slurry density} - \text{cement density})}{(\text{mix water density} - \text{cement density})},$$

using a microprocessor based system controller.

8. The method of claim 7, further comprising the following step:

calculating the desired rate of mix water injection from the product of the discharge rate of the slurry and the fraction of mix water in the slurry using the system controller.

9. The method of claim 8, further comprising the following steps:

generating a command signal representative of the desired rate of mix water injection using the system controller;

measuring the rate of mix water injection;

generating a mix water feedback signal representative of the rate of mix water injection using the system controller.

10. The method of claim 9, further comprising the following steps:

generating a mix water control signal from the command signal and the mix water feedback signal using a first servo-loop connected to the system controller; and regulating the rate of mix water injection as a function of the mix water control signal.

11. The method of claim 10, further comprising the following steps:

measuring the slurry level in the mixing chamber; and generating a slurry level feedback signal representative of the slurry level in the mixing chamber using the system controller.

12. The method of claim 11, further comprising the following steps:

generating a reference signal representative of the desired slurry level in the mixing chamber; and generating a cement control signal from the reference signal and the slurry level feedback signal using a second servo-loop connected to the system controller.

13. The method of claim 12, further comprising the following step:

regulating the rate of cement injection using the cement control signal.

14. The method of claim 13, further comprising the following step:

varying the speed of a mix water pump in response to the mix water control signal.

15. The method of claim 14, further comprising the following step:

varying the position of a regulating valve in response to the cement control signal to regulate the rate of cement injection.

16. The method of claim 14, further comprising the following step:

varying the speed of a rotary valve in response to the cement control signal.

17. The method of claim 15, further comprising the following steps:

measuring the density of the discharged slurry;

comparing the measured slurry density to the desired slurry density;

increasing the rate of mix water injection by a predetermined increment if the desired slurry density is lower than the measured slurry density; and decreasing the rate of mix water injection by the predetermined increment if the desired slurry density is higher than the measured slurry density.

18. The method of claim 17, further comprising the following step:

recirculating the slurry until the measured slurry density is substantially equal to the desired slurry density.

19. The method of claim 13, further comprising the following step:

varying the position of a control valve in response to the mix water control signal.

20. An automatic cementing system, comprising:

a mixing chamber for receiving liquid and dry cement, said mixing chamber mixing the liquid and dry cement to form a cement slurry;

an input line for supplying the liquid to the mixing chamber;

a slide-gate valve actuated by a control valve for regulating the flow rate of dry cement to the mixing chamber;

a pump for regulating the flow rate of mix water to the mixing chamber;

a sonic level sensor for measuring the slurry level in the mixing chamber and generating an electrical signal representative of the slurry level;

a first flow meter for measuring the flow rate of mix water to the mixing chamber and generating an electrical signal representative thereof;

a second flow meter for measuring the flow rate of slurry discharging from the mixing chamber and generating an electrical signal representative thereof;

a density meter for measuring the density of the slurry and generating an electrical signal representative thereof;

a system controller electrically connected to the level sensor, the first and second flow meters, the density meter, the control valve, and pump, said controller comprising:

an input device through which data may be entered;
one or more read-only memory units; and
an output device for displaying information;

a mix water servo-loop electrically connected to the system controller and to the pump, for controlling the speed of the pump as a function of the flow rate of slurry discharging from the mixing chamber; and a dry cement servo-loop electrically connected to the system controller and to the control valve, for controlling the actuation of the slide-gate valve as a function of the slurry level.

* * * * *